(12) United States Patent
Walthert et al.

(10) Patent No.: US 11,485,173 B2
(45) Date of Patent: Nov. 1, 2022

(54) HUB FOR AN AT LEAST PARTIALLY MUSCLE-POWERED BICYCLE

(71) Applicant: DT Swiss Inc, Grand Junction, CO (US)

(72) Inventors: Martin Walthert, Aarberg (CH); Stefan Spahr, Lengnau (CH)

(73) Assignee: DT SWISS INC., Grand Junction, CO (US)

( * ) Notice: Subject to any disclaimer, the term of this patent is extended or adjusted under 35 U.S.C. 154(b) by 68 days.

(21) Appl. No.: 17/066,263

(22) Filed: Oct. 8, 2020

(65) Prior Publication Data
US 2021/0023878 A1    Jan. 28, 2021

Related U.S. Application Data

(63) Continuation-in-part of application No. 16/862,816, filed on Apr. 30, 2020, now Pat. No. 11,400,754, (Continued)

(30) Foreign Application Priority Data

Jul. 26, 2016   (DE) .......................... 102016113731.6
Jul. 26, 2016   (DE) .......................... 102016113733.2
(Continued)

(51) Int. Cl.
*F16D 41/36* (2006.01)
*B60B 27/02* (2006.01)
(Continued)

(52) U.S. Cl.
CPC .......... *B60B 27/023* (2013.01); *B60B 27/001* (2013.01); *B60B 27/0005* (2013.01);
(Continued)

(58) Field of Classification Search
CPC ... B60B 27/047; B60B 27/001; B60B 27/023; B60B 27/0073; B60B 27/0031;
(Continued)

(56) References Cited

U.S. PATENT DOCUMENTS 5,676,227 A * 10/1997 Hugi ..................... B62K 25/02
                                                    301/124.2
6,588,564 B1    7/2003 Jager et al.
(Continued)

FOREIGN PATENT DOCUMENTS

DE   102009038794 A1 *  3/2011  ............ F16C 33/303
DE   102017116960 A1    2/2018
DE   102018105560 A1    6/2019

OTHER PUBLICATIONS

German Search Report in German Patent Application No. 10 2019 127 374.9, dated Sep. 2, 2020.

*Primary Examiner* — Tinh Dang
(74) *Attorney, Agent, or Firm* — Greer, Burns & Crain, Ltd

(57) ABSTRACT

A hub for a bicycle includes a hub shell and an axle device. The hub shell is supported rotatably relative to the axle device by way of bearing devices. A bearing device is configured as a roller bearing, and includes two bearing rings with rolling members disposed between, and is sealed axially outwardly. Between the bearing rings, the roller bearing includes a modular unit, at which a sealing unit is configured for laterally sealing the roller bearing, and including guide units protruding laterally inwardly from the modular unit for guiding the rolling members.

20 Claims, 7 Drawing Sheets

Related U.S. Application Data which is a continuation-in-part of application No. 16/503,110, filed on Jul. 3, 2019, now Pat. No. 11,220,133, and a continuation-in-part of application No. 16/255,231, filed on Jan. 23, 2019, now Pat. No. 10,933,691, and a continuation-in-part of application No. 16/039,831, filed on Jul. 19, 2018, now Pat. No. 10,995,806, and a continuation-in-part of application No. 15/882,423, filed on Jan. 29, 2018, now Pat. No. 10,625,540, application No. 16/255,231, which is a continuation-in-part of application No. 15/882,423, filed on Jan. 29, 2018, now Pat. No. 10,625,540, application No. 15/882,423, which is a continuation-in-part of application No. 15/659,830, filed on Jul. 26, 2017, now Pat. No. 10,442,245, and a continuation-in-part of application No. 15/659,850, filed on Jul. 26, 2017, now Pat. No. 10,549,578.

(30) Foreign Application Priority Data

| | | |
|---|---|---|
| Jul. 26, 2017 | (DE) | 102017116954.7 |
| Jul. 26, 2017 | (DE) | 102017116960.1 |
| Jan. 25, 2018 | (DE) | 102018101720.0 |
| Jul. 6, 2018 | (DE) | 102018116465.3 |
| Oct. 10, 2019 | (DE) | 102019127374.9 |
| Feb. 7, 2020 | (DE) | 102020103129.7 |

(51) Int. Cl.

| | |
|---|---|
| *B60B 27/00* | (2006.01) |
| *F16C 33/38* | (2006.01) |
| *B60B 27/04* | (2006.01) |

(52) U.S. Cl.

CPC ........ B60B 27/0073 (2013.01); B60B 27/047 (2013.01); F16C 33/3831 (2013.01); F16C 33/3875 (2013.01); F16D 41/36 (2013.01); *B60B 2380/12* (2013.01); *B60B 2380/14* (2013.01); *B60B 2900/111* (2013.01); *B60B 2900/311* (2013.01)

(58) Field of Classification Search

CPC ............ B60B 27/0078; B60B 27/0047; B60B 2380/14; B60B 2900/111; B60B 2900/311; B60B 27/0015; B60B 2320/10; B60B 2360/102; B60B 2360/36; B60B 2900/113; B60B 2900/321; B60B 2900/531; B60B 2900/541; B60B 2380/12; F16D 41/24; F16D 41/36; F16D 41/30; F16D 2121/14; F16D 2200/0021; F16D 2200/006; F16D 2250/0084; F16D 2300/12; F16D 3/385; B62M 6/40; F16C 35/077; F16C 16/06; F16C 33/62; F16C 33/416; F16C 33/7893

See application file for complete search history.

(56) References Cited

U.S. PATENT DOCUMENTS

| | | | |
|---|---|---|---|
| 9,574,642 B2* | 2/2017 | Pohl | .................... F16H 61/0204 |
| 10,442,245 B2 | 10/2019 | Walthert et al. | |
| 2015/0060224 A1* | 3/2015 | Lee | ........................ F16D 41/064 |
| | | | 192/45.004 |
| 2016/0010692 A1 | 1/2016 | Yonekura | |
| 2018/0050564 A1 | 2/2018 | Walthert et al. | |
| 2019/0152257 A1 | 5/2019 | Walthert et al. | |

* cited by examiner

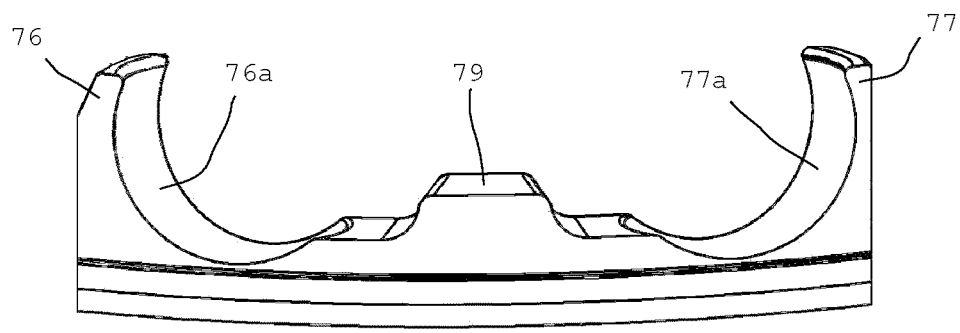
Fig. 8
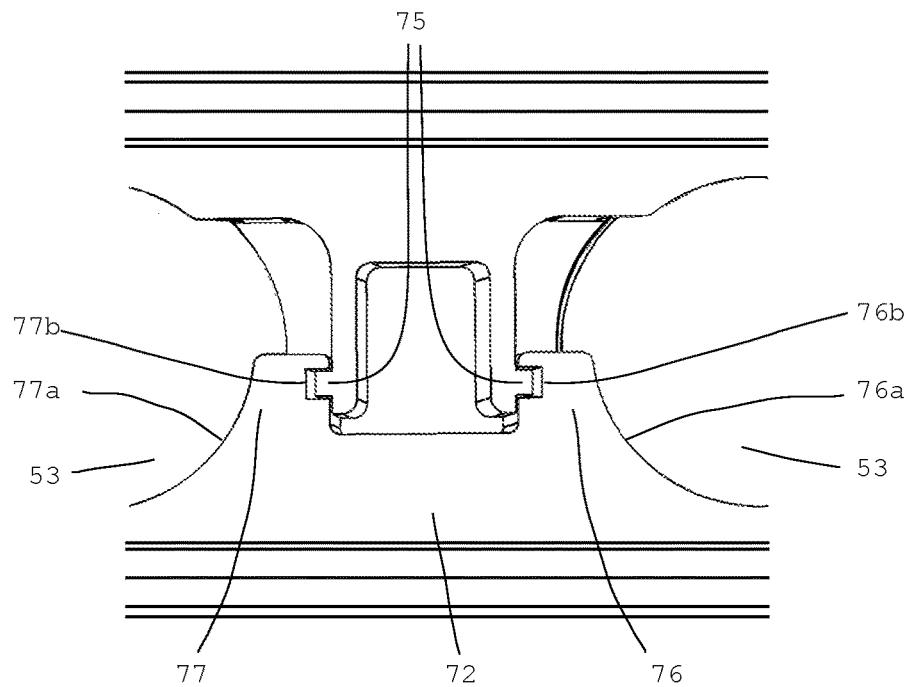
Fig. 9
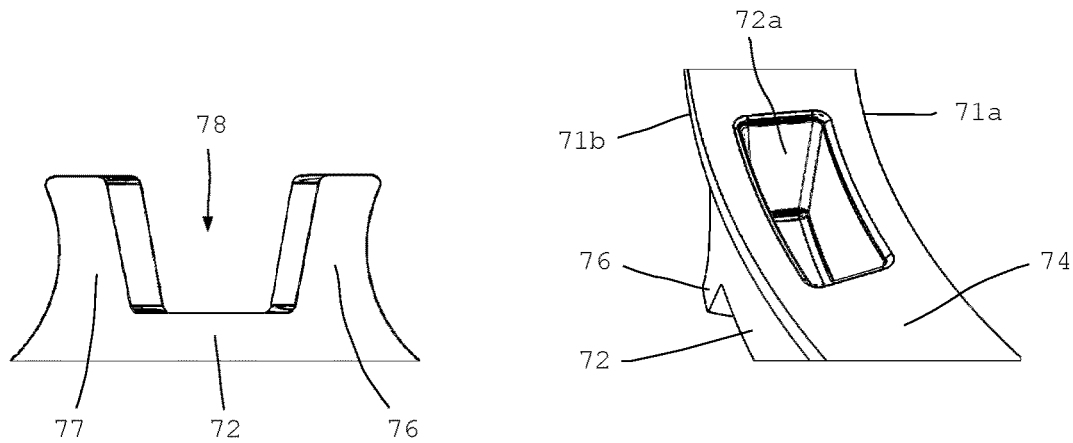
Fig. 10
Fig. 11

HUB FOR AN AT LEAST PARTIALLY MUSCLE-POWERED BICYCLE

RELATED APPLICATIONS

The present application a Continuation-in-Part of and claims 35 USC 120 priority from U.S. patent application Ser. No. 16/862,816 filed Apr. 30, 2020, which is a Continuation-in-Part of U.S. patent application Ser. No. 16/503,110 filed Jul. 3, 2019; is also a Continuation-in-Part of and claims 35 USC 120 priority from U.S. patent application Ser. No. 16/255,231 filed Jan. 23, 2019, which is a Continuation-in Part of U.S. patent application Ser. No. 15/882,423 filed Jan. 29, 2018, now U.S. Pat. No. 10,625,540, which is also a Continuation-in-Part of both U.S. application Ser. No. 15/659,830 now U.S. Pat. No. 10,442,245 and Ser. No. 15/659,850, now U.S. Pat. No. 10,549,578 both filed Jul. 26, 2017; and is also a Continuation-in-Part of and claims 35 USC 120 priority from U.S. patent application Ser. No. 16/039,831 filed Jul. 19, 2018, which is a Continuation-in Part of U.S. patent application Ser. No. 15/882,423 filed Jan. 29, 2018, which is also a Continuation-in-Part of both U.S. application Ser. No. 15/659,830 now U.S. Pat. No. 10,442, 245 and Ser. No. 15/659,850 now U.S. Pat. No. 10,549,578, both filed Jul. 26, 2017 all of which are incorporated by reference herein.

BACKGROUND

The present invention relates to a hub for a vehicle, which in normal and regular proper use is at least partially muscle-powered, and in particular for bicycles, the hub comprising a hub shell which is in particular rotatably supported relative to a hub axle by way of two roller bearings disposed on opposite end regions of the hub shell. In an embodiment as a rear wheel hub, the hub comprises a rotor for non-rotatable arrangement of at least one sprocket. The rotor is rotatably supported on the hub axle by at least two rotor bearings. In the case of a rear wheel hub a freewheel device is provided between the rotor and the hub shell. In the case of a front wheel hub, a rotor and a freewheel device are not required as a rule.

In the field of high quality cycling, the stressability and weight play a major role. The users set great store by high-grade components where each gram of weight counts.

Document DE 94 193 571 U1 has disclosed a hub with a toothed disk freewheel for rear wheels. The toothed disk freewheel works fast and reliably and transmits the driving force from the rotor to the hub shell. Concurrently, the friction loss is comparatively low while the user is not actuating the pedals. In this toothed disk freewheel, a pair of toothed disks transmits forward rotational force of the rotor to the hub shell while in backpedaling, the teeth disengage axially. The known hub per se functions satisfactorily and is used in the area of sports and also in professional riding. However, there is the disadvantage that the high loads acting on the hub for example in uphill rides may generate bending moments in the hub so as to cause the toothed disk to slightly tilt which results in higher wear on the teeth, which are subjected to higher forces, so that durability is limited and the toothed disks require early replacement to avoid malfunction. Moreover the hub has a relatively high weight.

EP 1 121 255 B1 has disclosed a lightweight hub having a toothed disk freewheel and showing a still more reliable function wherein the teeth of the toothed disks are stressed more evenly. This hub for the rear wheel uses a pair of toothed disks for the freewheel, both of which are axially movable and are axially urged toward one another from the outside by means of a spring. The two toothed disks are thus floatingly supported and for example in case of the hub flexing or given other types of stresses they may show better positioning to one another so as to provide more even wear on the toothed disks and a particularly reliable operation. However, an even stiffer hub and a more lightweight hub are desirable.

EP 3 275 692 B1 has disclosed a hub for a rear wheel of bicycles showing increased stiffness and a lower total weight. To this end, a hub-side freewheel component provided with axial toothing is screwed into the hub shell. In the interior of the hub-side freewheel component, a bearing seat is configured for accommodating one of the roller bearings to support the hub shell. This allows an increase in the axial bearing distance of the two roller bearings used for supporting the hub shell, thus increasing the stiffness of the hub. Moreover, the wall thicknesses of the hub shell can be reduced so as to reduce the total weight of the hub. However, further weight reduction and increase of the stiffness are desirable.

It is therefore the object of the present invention to provide a hub for at least partially muscle-powered bicycles to allow more ease of constructing and optionally a still stiffer design.

SUMMARY

A hub according to the invention is in particular configured as a bicycle hub and is provided to be used with an at least partially muscle-powered bicycle and comprises a hub shell and an axle device. The hub shell is supported by means of bearing devices to be rotatable relative to, and in particular (indirectly or directly) on, the axle device. At least one bearing device is configured as a roller bearing, comprising two bearing rings with rolling members disposed between. Between the bearing rings, at least one roller bearing receives a modular unit at which a sealing unit is configured, which is shaped in particular as a washer for laterally sealing the roller bearing, and comprising guide units laterally protruding inwardly from the modular unit, for guiding the rolling members.

The hub according to the invention has many advantages. The fact that the roller bearing comprises a modular unit which concurrently serves to guide the rolling members and to laterally seal the roller bearing outwardly and/or inwardly, enables a narrower construction of the roller bearing so as to save considerable weight. Reduction of the width of the roller bearing does not only allow to reduce the weight of the roller bearing itself and thus of the hub on the whole, but also to increase the lateral distance of the two roller bearings for supporting the hub shell relative to the axle device. This also provides a still stiffer hub which withstands increased loads and whose weight can be lower still. The compact structure of the modular unit including an in particular annular sealing washer and protruding laterally inwardly thereof, guide units for individually guiding the rolling members, enables a still more compact structure so as to still better utilize a tight mounting space. The hub volume may be reduced, so that aerodynamic drag is reduced as well. The wider support also positively influences the (lateral) stiffness of a wheel structured with a suitable hub.

A considerable advantage is also obtained by the fact that the hub according to the invention is provided for use in bicycles and bicycle-type vehicles. Thus, a bicycle wheel showing a circumference of ca. 2 m only rotates ca. 830 times per minute at a traveling speed of 100 km/h. This means that in real operation, the roller bearings in a hub operate as a rule at speeds of less than 1000 revolutions/min. This is considerably slower than in other technical fields where standardization tests for ball bearings are as a rule performed at speeds of 6000 revolutions/min. This is why less heat is generated in the interiors of roller bearings of bicycle hubs than in other applications involving higher rotational speeds, so as to allow using smaller dimensions and other materials.

Particularly preferably, the hub shows at least one narrow roller bearing and the axial width of the roller bearing is less than 1.7 times, and in particular less than 1.6 times the diameter of a rolling member of the roller bearing, in particular for increasing the axial distance between the roller bearings of the hub shell (and/or of a rotor) and to obtain a wider support.

Advantageously, for a wider support of the hub shell at least one roller bearing is configured narrow (or narrower) by way of configuring the guide units for guiding the rolling members and the sealing unit on one shared modular unit. Then, the shared modular unit in particular does not axially protrude beyond the bearing rings.

Particularly preferably, the roller bearings are disposed spaced apart as far as possible, and the hub shell has the widest possible support. To this end, the roller bearings are configured narrower by way of configuring the guide units for guiding the rolling members and the sealing unit on one shared modular unit accommodated radially between the inner ring and the outer ring. The inner ring and the outer ring preferably show the same width, any difference being preferably 0 or less than +/−1% or 2%.

In preferred specific embodiments, a bearing ring is configured as an inner ring and the other of the bearing rings, an outer ring. The rolling members are preferably accommodated axially between the modular units and, in particular, radially between the bearing rings. Deep-groove ball bearings are particularly preferably employed as roller bearings. Alternately, it is possible to employ a roller bearing in the shape of a separable ball bearing or the like.

The rolling members are preferably spherical in structure. The axial width of at least one or both of the bearing rings is preferably smaller than 1.7 times the diameter of a rolling member. Conventional, outwardly sealed deep-groove ball bearings, however, tend to show a ratio of the axial width of a bearing ring to the diameter of a rolling member of 1.8 or even 2.0 or more. The narrower structure and a reduction of the ratio from 2.0 to 1.7 or lower allow saving more than 5% weight. This is quite a lot in the field of high-quality bicycle components. Preferably the axial width of the roller bearing is smaller than 1.7 times (or 1.6 times) the diameter of a rolling member.

Particularly preferably, the ratio of the axial width of a bearing ring to the diameter of a rolling member is between 1.2 and 1.6 and particularly preferably between 1.4 and 1.6. Particularly preferably, the ratio of the axial width of the roller bearing to the diameter of a rolling member is between 1.2 and 1.6 and particularly preferably between 1.4 and 1.6.

Preferably, the sealing unit contacts, resting (in the radial direction) against, at least one bearing ring for sealing. Particularly preferably, the sealing unit contacts, resting (in the radial direction) against, both of the bearing rings for sealing. Preferably, the bearing rings protrude axially outwardly to both sides beyond the modular units. Particularly preferably, the modular units do not axially protrude beyond the roller bearing.

In advantageous configurations, the modular unit comprises an annular unit. The annular unit is, in particular, connected in particular integrally with the sealing unit configured in a washer shape. Particularly preferably, the sealing unit is a seal against at least one bearing ring.

Particularly preferably, the entire modular unit is configured of a single material or at least one-piece. In preferred configurations, the entire modular unit is substantially or completely made of one material.

Preferably, at least one roller bearing (and in particular all of the roller bearings) comprise(s) two modular units each, other than the bearing rings and the rolling members. The modular units are in particular provided on opposite axial sides of the roller bearing. It is particularly preferred for the modular units to show a narrow axial distance from the pertaining axially outside surface of the roller bearing. The modular units may, for example, show an axial distance between 0.1 and 1.5 mm from the axially outermost end. Thus, it is ensured that any components bearing against the bearing rings do not directly press on the modular units, which might cause increased friction.

It is possible and preferred for the two modular units to interlock by way of click elements (configured on the modular units). To this end, suitable projections on click elements may lock into depressions or recesses to interconnect the two modular units. Alternately, it is possible to (lock and) retain the two modular units on the roller bearing via the rolling members. Thus, a modular unit may partially enclose individual rolling members by means of the guide units from one side, and the other modular unit may partially enclose individual rolling members from the other side. Alternately, it is possible for the two modular units to interlock by means of click elements on one side, and to be retained on the roller bearing by means of the rolling members on the other side. Preferably, the guide units are at least partially resilient, locking in the final position during mounting.

In particular, at least some of the guide units extend at least partially in the axial direction over between 45% or 50% or 55% and 80% of the axial width of at least one bearing ring. In particular, at least some of the guide units extend in the axial direction over between 60% and 70% of the axial width of at least one bearing ring. In the case that each of the two guide units extend from what is the other side, for example over 65% in the axial direction, an overlap of 30% ensues. Optionally more, if the modular unit shows an axial distance from what is the axially outside surface of the bearing ring.

In preferred configurations, the guide units show rounded and, in particular, spherical or cylindrical guide surfaces facing away from one another, for rolling members. One rolling member each is in particular guided on the guide surfaces facing away from one another. Thus, one rolling member each is guided on one guide surface of the two outside surfaces of a guide unit. It is possible and preferred for one guide unit to comprise two guide members (axially) protruding from the modular unit, between which a recess is configured for example in the shape of a groove or the like. Thus, the weight is reduced and manufacturing is simplified. This guide unit also guides two rolling members.

In advantageous embodiments, the interior of the guide unit shows at least one recess and/or at least one hollow space. This allows for one, to reduce the weight and for another, to simplify manufacturing since the flow characteristics of the materials can be better taken into account for manufacturing the modular unit.

In advantageous specific embodiments, an axial elevation for separating the rolling members is configured between two guide units on the axially inside surface of the annular unit. A number of guide units is distributed over the circumference of the annular unit. Preferably, each of the guide units shows on its circumferentially outside surfaces, one guide surface each for guiding one of the rolling members. Due to this, two rolling members are disposed between two circumferentially adjacent guide units which are reliably separated by the axial elevation. Dedicated guide surfaces may be configured on the axial elevation.

In particularly preferred specific embodiments, the two modular units are identical in construction. This simplifies manufacturing and assembly and storage. Particularly preferably, the two modular units interlock at an offset when mounted. Connecting the two modular units is not required. The feature of the two modular units interlocking at an offset, preferably means firstly, that a guide unit of one of the modular units is positioned between two guide units of the other modular unit during mounting. Thus, the guide units of the two modular units alternate over the circumference. It is in particular possible and preferred that on one of the sides of each rolling member, one guide unit of the one modular unit provides a guide surface for the rolling member, while on the other side of the rolling member, a guide unit of the other modular unit forms a guide surface for the same rolling member. All of the rolling members are in particular provided with a guide surface of one of the modular units on one circumferential surface, and a guide surface of the other of the modular units, on the other circumferential surface.

Preferably, at least during mounting, a device is disposed between the guide units which brings the rolling members to the correct position during assembly of the roller bearing (at least while inserting the sealing units). Mounting is thus simplified.

In preferred configurations, the modular unit consists at least partially and in particular nearly completely or entirely of plastics and particularly preferably of a polyamide. PA66 is particularly preferably used.

Using polyamide is also possible because relatively low speeds of a maximum (as a rule) of less than 1000 revolutions/min is reached. In this way, even in high traveling speeds of a bicycle, the waste heat generated in the roller bearings is relatively low, so that materials such as polyamide or like or similar materials are suitable for forming the guide units and also for forming sealing lips of the sealing unit of the modular unit.

Preferably, at least one bearing ring consists at least partially of steel or at least partially of ceramics. It is also possible to use a metal-matrix composite for the bearing rings and optionally also for the rolling members. Such a composite consists of a continuous metal matrix together with an in particular discontinuous ceramic or organic reinforcement in their interiors. The reinforcement may comprise reinforcing elements in the shape of fibers or whiskers. Reinforced aluminum, reinforced magnesium and copper materials and in particular titanium or steel may be used. The matrix is, in particular, an elemental metal or preferably an alloy. For the reinforcing phase, for example ceramic particles (e.g. silicon carbide), short fibers, continuous fibers (based on carbon) or open-pored foams may be used.

It is also possible for at least one bearing ring to be configured as a hybrid bearing ring consisting at least partially of steel and at least partially of ceramics. Both of the bearing rings may be configured as a hybrid bearing ring. Partially or completely using ceramics allows further weight reduction. Particularly preferably, the rolling members consist at least partially and in particular completely of steel.

In all the configurations, it is particularly preferred for the sealing surfaces of the bearing ring to be ground. This means that the sealing unit is in rubbing contact with the radially inwardly and the radially outwardly sealing surfaces, bearing against the inner respectively outer bearing ring, where little friction occurs. This allows permanent operation and achieves high stability under load. The low friction between the contacting sealing surfaces and the inner and outer bearing rings ensures a high degree of seal tightness combined with low friction.

Preferably, the interior of the roller bearing, between the sealing units of the two modular units, is provided with a quantity of lubricant sufficient for lubricating the rolling members over the service life of the roller bearing. This eliminates servicing of the roller bearings. In the case of wear or defects, the entire roller bearings can be exchanged.

In specific embodiments, the axial width of at least one of the roller bearings, given an external diameter between 20 mm and 40 mm, is less than 6.5 mm and in particular less than 6 mm. Particularly preferably, the axial width of at least one of the roller bearings is <6 mm, given an external diameter of the roller bearing between 24 mm and 30 mm. For example, given an external diameter of 24 mm or 25 mm, the axial width of the roller bearing may be between 5 mm and 6 mm and in particular 5.5 mm+/−0.1 mm.

Preferably, at least one of the roller bearings is designed for a speed of less than 2000 revolutions/min and in particular for a permanent speed (in operation) of less than 1500 and preferably less than 1000 revolutions/min. Particularly preferably, the axle device comprises a hollow axle as the hub axle. The hollow axle in turn allows passing through a quick release when mounting to the bicycle. Such a quick release may show a thin quick release axle or a thicker through axle.

Preferred more specific embodiments provide for the hub to be configured as a rear wheel hub. Preferably, the hub comprises a rotor rotatably supported relative to the hub axle by means of at least two rotor bearings configured as roller bearings. A freewheel device having two interacting freewheel components is in particular provided namely, a hub-side freewheel component and a rotor-side freewheel component. The two freewheel components each preferably comprise axial engagement elements and they are movable relative to one another in the axial direction at least between a freewheel position and an intermeshing engagement position. The hub-side freewheel component preferably provides for defined accommodation of a rolling member to support the hub shell relative to the axle device respectively the hub axle. The hub shell preferably includes an attachment portion and a centering portion. An attachment region and a centering region are in particular configured in the hub-side freewheel component. Particularly preferably, the attachment region is connected with the attachment portion and the centering region is centered at the centering portion. This provides high stability and stiffness combined with a low weight rear wheel hub. Moreover, reliable mounting can be ensured.

Particularly preferably, a hub configured as a rear wheel hub comprises a freewheel device with two freewheel components. At least one of the freewheel components preferably forms part of a freewheel unit. The freewheel comprises a freewheel component, a support unit and at least one spring unit. The freewheel component preferably comprises a tubular body section extending around a central axis and configured hollow, showing a non-round outer contour for non-rotatable and axially displaceable coupling, and a front surface with axial engagement components. The spring unit preferably urges the freewheel component and the support unit apart in an axial direction of the central axis. The freewheel component, the support unit, and the spring unit in particular form a pre-assembled module. The spring unit is attached to the freewheel component and to the support unit.

A hub having such a freewheel unit forming a pre-assembled module, allows reliable and reproducible mounting. This allows a reduction in required tolerances, so that even some wall thicknesses can be reduced, thus reducing the total weight.

In preferred configurations of a hub according to the invention, the hub comprises a hub shell which is supported for rotation relative to the axle device by means of bearing devices configured as hub bearings. This hub comprises a rotor with at least two rotor bearings that is supported for rotation relative to the axle device, and a freewheel device with two interacting freewheel components, a hub-side freewheel component and a rotor-side freewheel component, wherein the two freewheel components each comprise axial engagement elements and are movable relative to one another in the axial direction at least between a freewheel position and an intermeshing engaging position, wherein in the engaging position a driving torque can be transmitted in a direction of drive rotation. The hub-side freewheel component comprises an axial, threaded body section and is screwed into the hub shell by means of a thread. The hub-side freewheel component comprises an annular surface on which the axial engagement elements are formed at least in part. The rolling members of a hub bearing are located in a defined accommodation within the hub-side freewheel component to support the hub shell relative to the axle device. The hub-side freewheel component comprises at least one tool contour configured for coupling with a matching tool for unscrewing the hub-side freewheel component from the hub shell.

In another specific embodiment, and configuration of the hub, the hub shell is supported for rotation relative to the axle device by means of bearing devices configured as hub bearings. The hub comprises a rotor with at least two rotor bearings supported for rotation relative to the axle device, and a freewheel device with two interacting freewheel components, a hub-side freewheel component and a rotor-side freewheel component, wherein the two freewheel components each comprise axial engagement elements and are movable relative to one another in the axial direction, at least between a freewheel position and an intermeshing engaging position. The hub-side freewheel component provides for defined accommodation of rolling members to support the hub shell relative to the axle device. An attachment portion and a centering portion are configured in the hub shell, and an attachment area and a centering area are configured on the hub-side freewheel component. The attachment area is connected with the attachment portion and the centering area is centered on the centering portion.

A considerable advantage of the hub according to the invention is the simple construction and the weight advantage obtained by the construction.

The modular units are preferably accommodated between the bearing rings. Particularly preferably, one sealing unit each, in particular washer-shaped, is formed on a modular unit for laterally sealing the roller bearing.

In all the configurations, the modular units of the roller bearings of the hubs provide a combined sealing and guiding device. In this respect, the term "modular unit" may be continuously replaced by the term "combined sealing and guiding device".

The modular units are in particular radially disposed between the bearing rings. The modular unit is preferably provided with an annular sealing washer each for laterally sealing the roller bearing. Guide members protrude in particular laterally inwardly respectively guide members project laterally inwardly from the modular unit or the sealing washer so as to guide the rolling members.

The guide units of a modular unit, and in particular, of both of the modular units combined also form a cage respectively two cage units by means of which the rolling members are retained between the bearing rings spaced apart from one another.

The sealing unit bears against, making contact with, at least one and preferably both of the bearing rings, at least in sections and particularly preferably in its entirety. This reliably seals the roller bearing axially outwardly.

On the whole, the width of the bearing rings of the roller bearings can be reduced. This provides more lightweight hubs. Bearings can be arranged in a hub with a higher degree of freedom. It is also possible to increase the system stiffness combined with a reduced total weight. The width of the roller bearings can be reduced by more than 10% and in particular by 15% or ca. 20%. For example, the presently used bearing rings showing 7 mm width can be reduced to a width of ca. 5.5 mm.

Due to the narrower roller bearings, a hub can be provided showing an increased distance of the roller bearings for supporting the hub shell and/or the rotor. Given a mounting width of a front wheel hub of e.g. 110 mm, an enlargement of the roller bearing distance by 3 mm is quite a considerable enlargement. In the case of a rear wheel hub, this applies even more, although the mounting widths may be e.g. 130 mm or 150 mm. In the case of rear wheel hubs, the rotor and the freewheel constrict the space available still more, so that enlargement of the bearing distance involves great advantages.

Due to the relatively low maximum speed of the roller bearings for the hubs according to the invention, metal cages do not need to be used for the rolling members of the standardized deep-groove ball bearings. This allows for a one-piece modular unit which takes care both of inwardly and outwardly sealing and of positioning each of the rolling members.

Each of the modular units in particular guides one half of the rolling members and in particular the balls and preferably retains them in position.

BRIEF DESCRIPTION OF THE DRAWINGS

Further advantages and features of the present invention can be taken from the exemplary embodiments which will be discussed below with reference to the enclosed figures.

The figures show in:

FIG. 8 a detail view of a further modular unit of a roller bearing for a hub according to the invention;

FIG. 9 a detail view of another modular unit of a roller bearing for a hub according to the invention;

FIG. 10 a detail view of a variant of the modular units according to FIGS. 6, 7 and 8;

FIG. 11 a detail view of still another variant of the modular units according to FIGS. 6 through 9;

DETAILED DESCRIPTION

Figure 1:
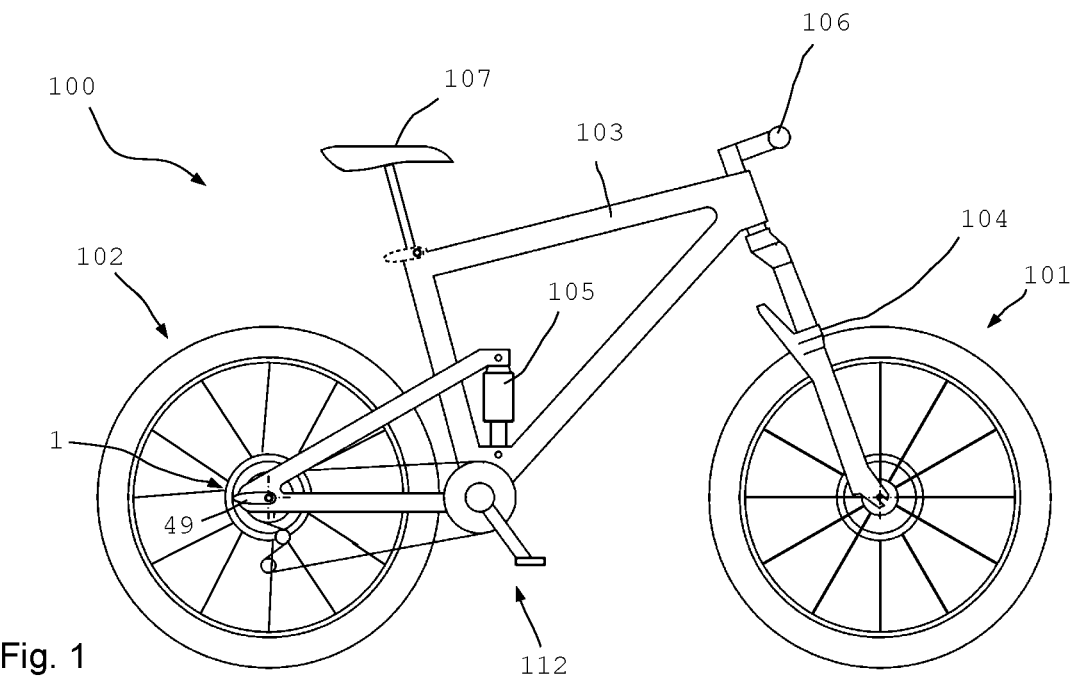
FIG. 1 a schematic illustration of a mountain bike.
Figure 2:
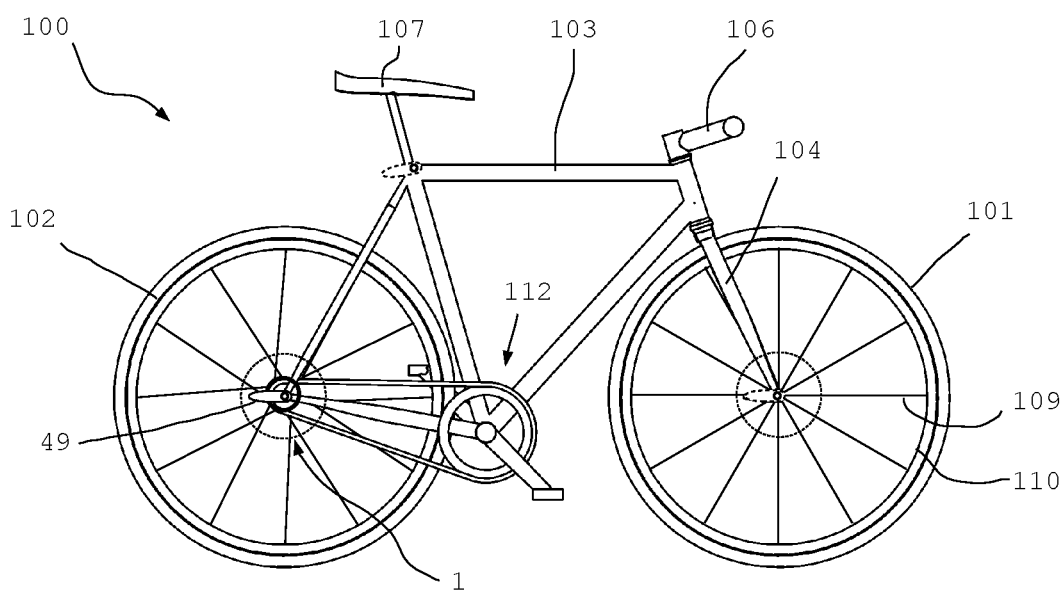
FIG. 2 a schematic illustration of a racing bicycle.

The FIGS. 1 and 2 illustrate a mountain bike or racing bicycle 100 respectively which are equipped with hubs 1 according to the invention. The racing bicycle and the mountain bike each comprise a front wheel 101 and a rear wheel 102 equipped with hubs 1. The two wheels 101, 102 are provided with spokes 109 and a rim 110. Conventional caliper brakes or other brakes such as disk brakes may be provided.

A bicycle 100 comprises a frame 103, a handlebar 106, a saddle 107, a fork or suspension fork 104 and in the case of the mountain bike, a rear wheel damper 105 may be provided. A pedal crank 112 with pedals serves as a drive. Optionally, the pedal crank 112 and/or the wheels may be provided with an electrical auxiliary drive. An auxiliary drive may be accommodated in the bottom bracket or e.g. in the seat tube, visible from the outside or invisible. The battery may likewise be accommodated inside the frame. The hubs 1 of the wheels may be attached to the frame by means of a through axle or a quick release 49.

With reference to the FIGS. 3 to 18, a hub 1 according to the invention for a rear wheel 102 will be described. Another hub 1 according to the invention for a rear wheel 102 is illustrated in FIG. 20. A hub 1 according to the invention for a front wheel is illustrated in FIG. 19 and may, in particular comprise parts according to the FIGS. 5 through 11.

Figure 3:
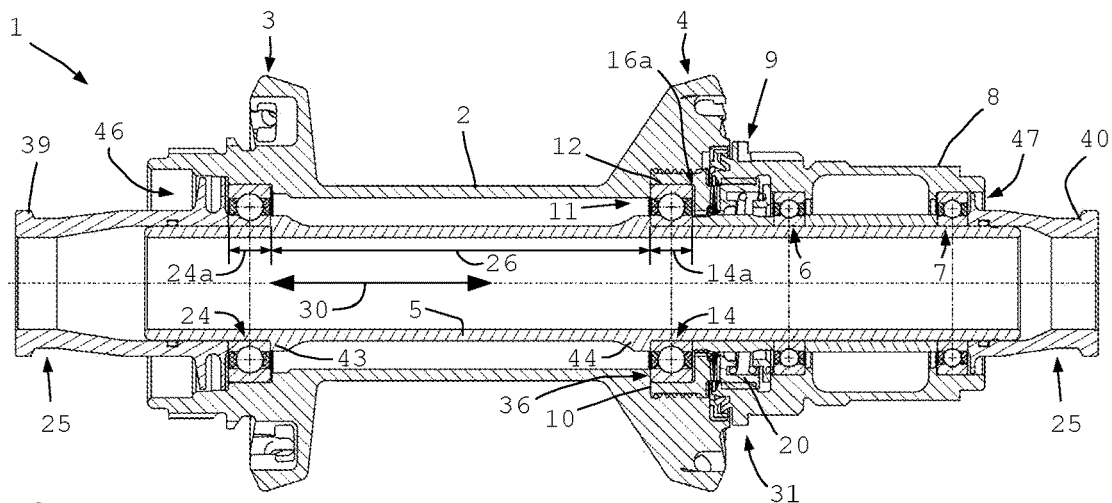
FIG. 3 a section of a rear wheel hub.
Figure 4:
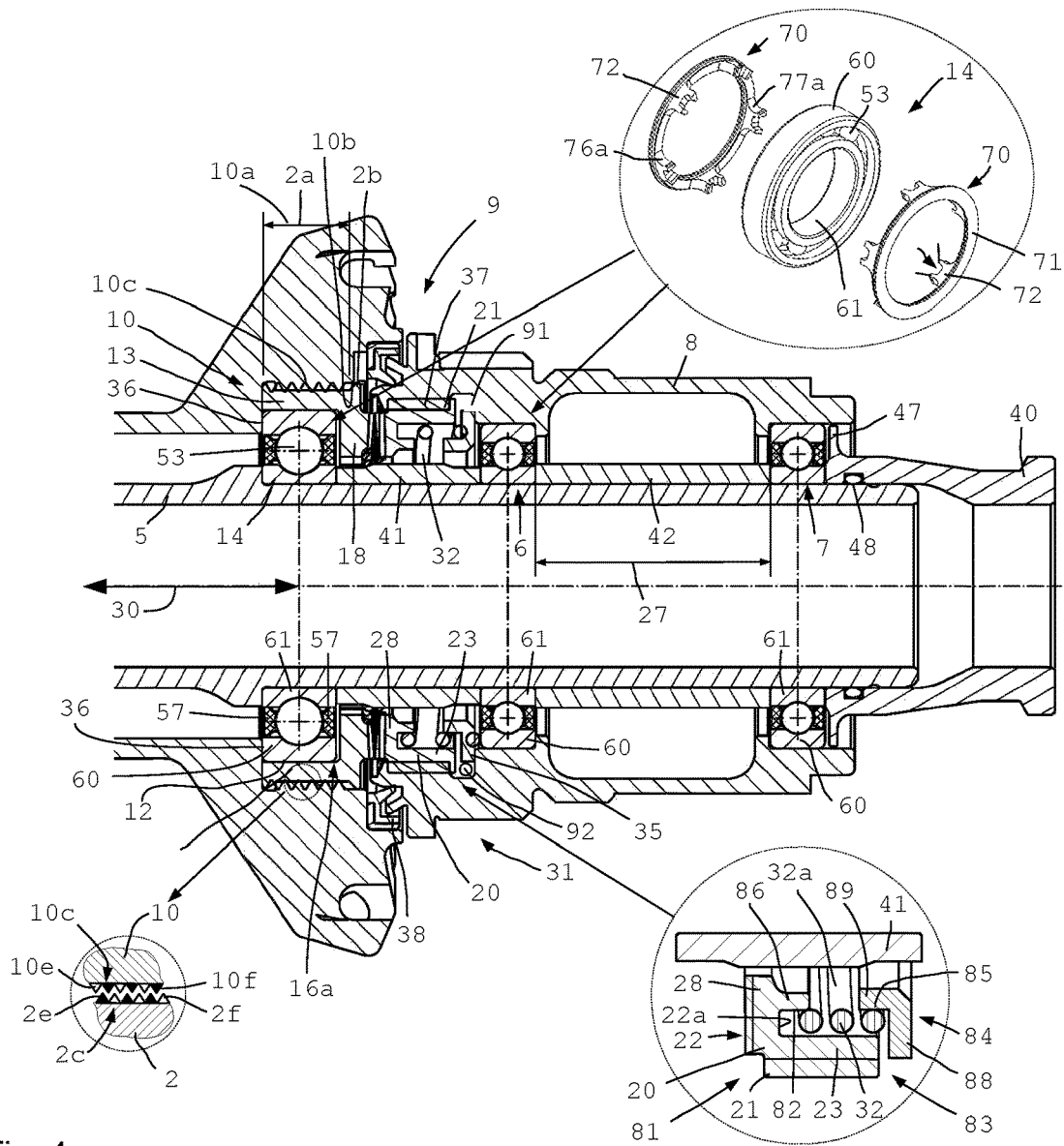
FIG. 4 an enlarged detail of the section in FIG. 3.
Figure 19:
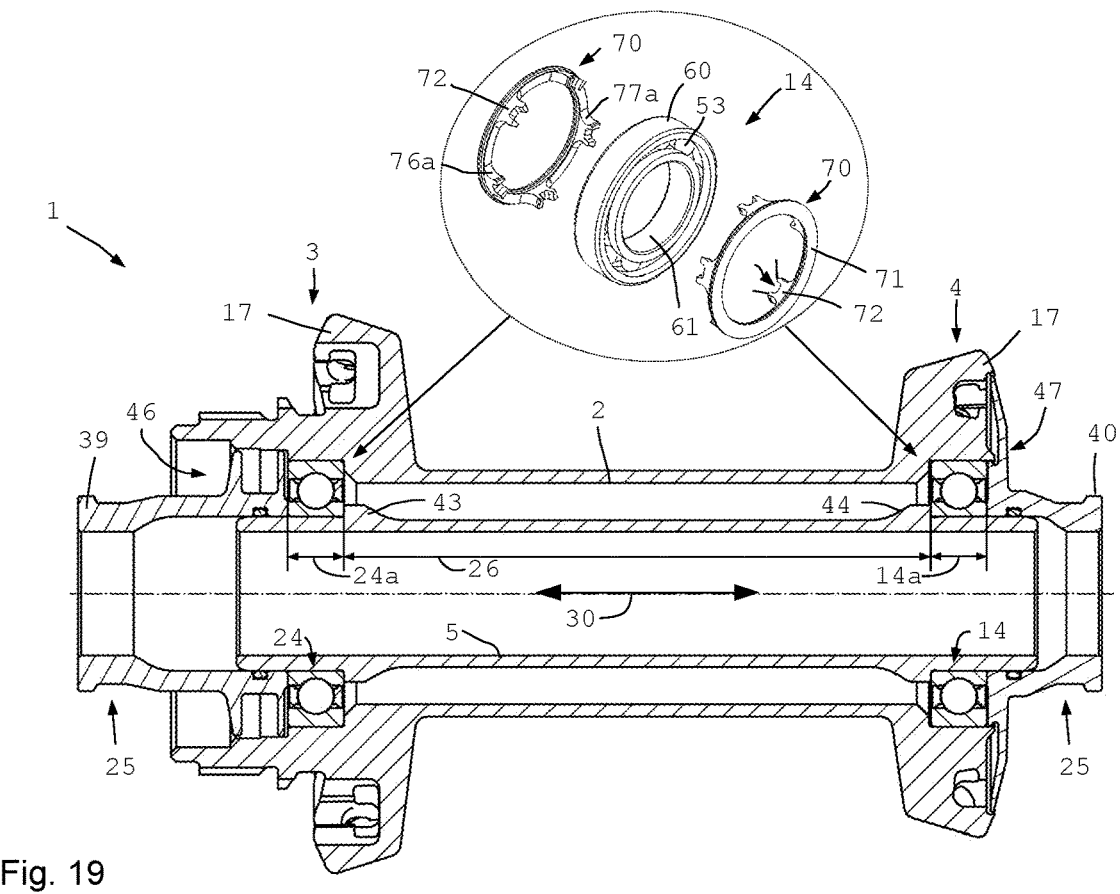
FIG. 19 a cross section of a front wheel hub.
Figure 20:
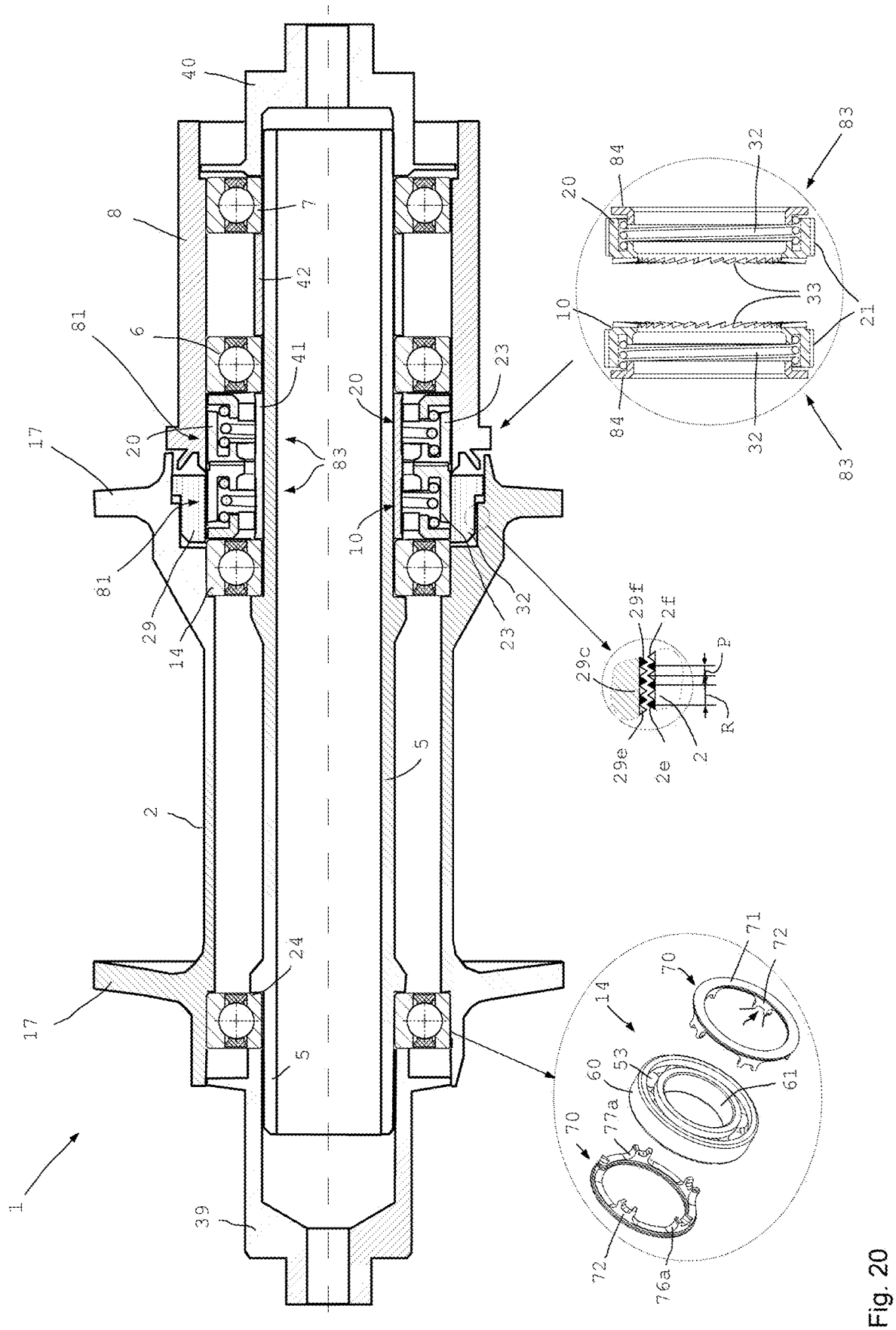
FIG. 20 another hub in a simplistic cross-section.

FIG. 19 shows in a section the hubs 1 inserted in the front wheels 101 of the bicycles according to FIGS. 1 and 2. FIGS. 3 and 4 show in a section the hubs 1 inserted in the rear wheels 102 wherein FIG. 4 illustrates an enlarged detail from FIG. 3.

The hub 1 according to the invention illustrated in FIG. 3 comprises a hub shell 2 which is rotatably supported in the axial end regions 3 and 4 by means of the roller bearings 24 respectively 14 to be rotatable relative to, and presently immediately on, a hub axle 5. This means that the roller bearings 14, 24 are each directly disposed on the hub axle 5.

The hub 1 furthermore comprises a rotor 8 on which to dispose at least one sprocket. In particular, a sprocket cluster may be pushed on and attached or arranged. A freewheel device 9 including two freewheel components 10, 20 is provided between the rotor 8 and the hub shell 2. The hub-side freewheel component 10 and the rotor-side freewheel component 20 are comprised. The rotor-side freewheel component 20 is part of a freewheel unit 81.

To prevent entry of water and dust into the interior of the hub 1 and in particular admission of water and dust to the freewheel device 9, a sealing device 38 is configured between the rotor 8 and the hub shell 2, comprising a labyrinth-like sealing gap and a downstream lip seal contacting the rotor 8 and reliably protecting the freewheel 9 from entry of dirt and water.

Limit stops 39 and 40 are pushed onto the two ends of the hub axle which—in particular, while the wheel equipped therewith is not clamped in the frame—are secured on the hub axle by way of O-rings 48. The limit stops 39 and 40 are each provided with a sealing flange 46 or 47 protecting the ends of the hub 1 from entry of dirt and water. This rotor-side limit stop 40 is provided with a radial sealing flange 47 while the other limit stop 39 is provided with a double flange 46 consisting of a pair of circumferential radial sealing flanges between which an axial distance and free space is formed.

The two limit stops 39 and 40 are each provided with a taper 25 which serves as a recessed grip and simplifies pulling a limit stop 39, 40 off of the axis 5 after removing a wheel.

The roller bearings 14, 24 for rotatably supporting the hub shell 2 rest in the axial direction on radial shoulders of bulges 43, 44 of the hub axle 5. The bulges 43 and 44 are each located axially inwardly of the (hub shell) roller bearings 14, 24. The roller bearings 14, 24 show an axial width 14a respectively 24a each.

In all the configurations of the hub 1, the bulges 43, 44 preferably show a somewhat larger radial wall thickness of the hub axle 5. In particular, is the radial wall thickness in the region between about 1.5 times and three times the radial wall thickness in the other regions. Other than the bulges 43, 44 the hub axle 5 is substantially a hollow cylinder in configuration and shows differences in the wall thickness of preferably less than 20% and in particular, less than 15% or less than 10% or less than 5% or less than 2%. Preferably, the relation of the maximum outer diameter of the hub axle (including bulge) to the minimum inner diameter of the hub axle is less than 2.0 and, in particular, less than 1.75 and preferably less than 1.6. Preferably, the relation of the maximum outer diameter of the hub axle to the minimum inner diameter of the hub axle is larger than 1.25 and in particular larger than 1.4. Preferably, the inner through hole of the hub axle is cylindrical in configuration and comprises a constant clear inner diameter over at least a substantial portion of the length or over the entire length.

The rotor 8 is supported, in this case directly, on the axle 5, rotatable via two roller bearings 6 and 7 which serve as rotor bearings.

The roller bearing 14 is accommodated inwardly of the hub-side freewheel component 10 in a central receiving space 11 in a defined location on a bearing seat 12. This saves considerable axial mounting space so that the stability and stiffness of the hub can be increased. Moreover, the total weight of the hub 1 is considerably reduced. Both the weight of each of the freewheel components and the weight of the hub shell can be reduced since the wall thickness in the rotor-side end region 4 of the hub shell 2 can be reduced.

FIG. 4 shows an enlarged detail from FIG. 3, with the freewheel device 9 once again shown in the engaging position 31, in which the engagement elements 33, designed in particular as axial toothings (see FIG. 14), of the freewheel component 10 and the freewheel component 20 are in non-rotatable engagement with one another. The engagement components 33 are configured such that, given a rotational direction in the driving direction, a rotational force is reliably transmitted to the hub shell, while given an opposite rotational direction, the freewheel component 20 is urged axially outwardly counter to the biasing force of the spring unit 32 until the engagement components 33 disengage so as to enable a rotation of the rotor relative to the hub shell. The rotor-side freewheel component 20 is provided with a tubular body section 23 showing a non-round outer contour 21. The non-round outer contour 21 meshes with a matching, non-round inner contour 37 in the rotor and is axially displaceable in parallel to the axial direction of the central axis or axis of symmetry 30 in the rotor 8.

The hub-side freewheel component 10 shows in radial cross-section an approximately L-shaped configuration where an axial and tubular body section 13 has a single-thread and presently preferably multiple external thread 10c in an attachment area 10a that is screwed into a corresponding (single-thread or multi-thread) internal thread 2c in the attachment portion 2a in the hub shell so that the freewheel component 10 is axially fixedly, and in the driving direction non-rotatably, connected with the hub shell 2.

The small detail on the bottom left in FIG. 4 shows a conceivable design in which multiple threads 2c respectively 10c are configured in the hub shell 2 respectively the hub-side freewheel component 10. Then two (parallel) thread grooves 2e and 2f or 10e and 10f of the multiple thread 2c respectively 10c are present in the hub shell 2 respectively the hub-side freewheel component 10. Alternately, it is possible to only provide one single thread groove each.

The centering portion 2b in which the centering area 10b of the hub-side freewheel component 10 is received in a close fit serves for defined radial positioning of the hub-side freewheel component 10 and the roller bearing 14 accommodated therein. In particular is the fit nearly without play. An interference fit may be provided so that the hub-side freewheel component 10 is pressed into the hub shell 2 during screwing in.

A cylindrical bearing seat 12 is formed radially inwardly of the axial body section 13 where the rotor-side roller bearing 14 is accommodated to rotatably support the hub shell 2. When the roller bearing 14 is mounted it is form-fittingly accommodated with its inner ring 61 in the axial direction between the bulge 44 and the sleeve body 41.

The force-fit in the axial direction 30 is effected from the limit stop 40 via the inner ring of the rotor bearing 7, the sleeve body 42, the inner ring of the rotor bearing 6, the sleeve body 41, the inner ring of the roller bearing 14 and it is then introduced via the radial bulge 44 into the hub axle 5 from where it is transmitted via the radial bulge 43 to the inner ring of the roller bearing 24 from where the clamping force is ultimately dissipated via the limit stop 39.

In the mounted state, the inner end of the hub-side freewheel component rests against a radial shoulder 36 within the hub shell 2. In the mounted state, the outer ring 60 of the roller bearing 14 also rests against this shoulder 36.

The roller bearing 14 shows a free distance 16a from the inside surface of the annular flange 18 of the hub-side freewheel component 10.

The roller bearings 14, 24 and presently also the rotor bearings 6, 7, are each provided with two modular units 70 including a sealing unit 71 each for sealing the roller bearings and each including a number of guide units 72 for individually guiding the rolling members. The roller bearings 14, 24 and the rotor bearings 6, 7 each comprise rolling members 53.

A multiple thread connection between the hub shell and the hub-side freewheel component 10 is advantageous since it exerts less axial forces on the hub shell than does a single-thread screwed connection showing the same pitch. The reason is that the gradient angle of the thread groove is considerably larger so that smaller axial forces result. Disassembly is also facilitated since self-retention is lower. Due to the lower axial forces, the hub shell is subjected to lower loads. The wall thicknesses can be reduced while durability is increased.

The rotor-side freewheel component 20 comprises on its front face 22 a rotor-side annular flange 28 on which the engagement components 33 are configured. The rotor-side annular flange 28 is in particular configured integrally with the tubular body section 23.

FIG. 4 shows on the top right an enlarged exploded view of the roller bearing 14 for supporting the hub shell relative to the hub axle 5. The rotor bearings 6 and 7, whose diameters are somewhat smaller, are configured correspondingly.

The roller bearing 14 (and the other roller bearing 24 for supporting the hub shell 2) comprise(s) an inner ring 61 and an outer ring 60. The roller bearings 14, 24 are configured as deep-groove ball bearings showing, radially between the bearing rings 60, 61, a number of rolling members 53 designed as balls. For laterally sealing and for guiding the rolling members 53, modular units 70 are provided to the right and the left on the axial sides of the roller bearing 14 so as to seal off the interior of the roller bearing 14 while simultaneously guiding, respectively retaining in position, the rolling members 53.

To this end, the modular units 70 are axially approached from the side concerned and the guide units 72 axially protruding from the annular sealing unit 71 are introduced between the bearing rings 60, 61 respectively they are mounted so that the guide members 76, 77 of the guide units 72 guide one ball each on the guide surfaces 76a, 77a. Since each of the modular units 70 is provided with a plurality of guide units 72 (presently, five each), a corresponding number of rolling members may be guided. Overall, there are ten guide units for guiding a total of 20 rolling members. The modular units 70 are mounted such when mounting the roller bearings so as to leave a slight lateral clearance up to the axial outer edge of the bearing rings. This prevents the modular units 70 from protruding axially outwardly. The radially outer surfaces and inner surfaces of the sealing unit 71 bear against, making contact with, the pertaining inner sealing surface of the outer ring 60 and the outer sealing surface of the inner ring 61. To this end, the corresponding sealing surfaces of the bearing rings 60 and 61 are ground so as to reduce friction.

An axially reproducible positioning of the modular units 70 is ensured by the guide surfaces 76a and 77a of the guide members 76 and 77, which grip respectively guide the rolling members 53 resiliently, so as to provide a sufficiently firm seat of the modular units 70 on the roller bearing 14 (respectively 24, or 6, 7).

This construction noticeably increases the distance 26 between the roller bearings 14, 24 for supporting the hub shell. The distance 27 between the rotor bearings 6 and 7 can likewise be clearly increased. This increases the stability and stiffness of the hub 1 on the whole.

The enlarged detail on the bottom right in FIG. 4 shows a section of the freewheel unit 81 and the sleeve body 41 disposed on the hub axle. The freewheel unit 81 is configured as a preassembled assembly 83 and comprises the freewheel component 20, a spring unit 32 acting as a biasing device and a support unit 84. The spring unit 32, presently configured as a coil spring, extends around the circumference of the central axis 30 by means of the spring body. This results in a large-diameter coil spring. At one of the coil ends the spring unit 32 is fixedly connected with the freewheel component 20 secure against loss and at the other of the ends the coil spring 32 is fixedly connected with the support unit 84 secure against loss. This coil spring is coupled with the freewheel component 20 respectively the support unit 84 in a force-fit. The connecting force is sufficient so as to reliably hold the assembly together, preferably during mounting and in normal operation, and also during demounting and to prevent it from falling apart while on the other hand allowing manual demounting.

This freewheel component 20 shows an approximately L-shaped configuration in radial cross-section. The long leg of the "L" is formed by the tubular body section 23. The short leg of the "L", presently facing radially inwardly, is formed by the front face 22 of the freewheel component 20. The front face is provided with the engagement components 33. A takeup tab 86 is disposed axially rearwardly on the annular flange 18 which provides on its front the front face 22 and in this case is in particular configured as a circumferential takeup flange 86. The takeup flange 86 extends from the axially inside surface of the annular flange (also denoted front flange) sleeve-like rearwardly. The sleeve-like body extends approximately concentric to the tubular body section 23. The takeup flange 86 may be cylindrical but it may show conical sections to e.g. facilitate pushing on or to ensure a better hold.

An accommodation section 82 for fastening the spring unit 32 is provided on the radially outside surface of the circumferential takeup flange 86. The spring unit 32 is pushed with a coil end or coil portion onto the takeup flange 86 where it is retained in a force fit. For better gripping, the front end of the spring unit 32 may be bent radially inwardly or outwardly to achieve a firmer grip on the takeup flange 86. To this end a length of 2 to 5 mm may be slightly bent over at the coil end.

On the radially outside surface and/or inside surface of the circumferential takeup flange 86, a circumferential recess may be configured which serves as a form-fit accommodation of the end of the spring unit 32.

At the front end the spring unit 32 is typically supported over at least part of the circumference on the inside surface (supporting surface) 22a of the annular flange 18.

At the other end of the spring unit 32, at least part of a coil 32a or at least a coil end 32b is supported on the support unit 84 which comprises a support disk 88 and a support tab 89. The support tab 89 may be configured as a circumferential support flange. On the radially outside surface, at least one coil portion of the spring unit 32 rests against the support tab respectively the support flange 89 in a force fit and/or form fit. Clamping can be achieved by way of the diameter of the spring unit 32 being slightly smaller than the outer diameter of the support flange prior to mounting. Alternatively, it is possible for the end of the coil to be slightly bent radially inwardly to achieve better clamping. It is also possible for the support flange to show a (an at least partially) circumferential recess in which the end of the spring unit 32 is received in a form fit.

The support unit rests, for example, on a radial shoulder 35 in the rotor 8 on the axially outside surface to enable reliable dissipation of the forces occurring. When manufacturing the rotor and forming the non-round inner contour 37 of the rotor, which enables a non-rotatable accommodation and axial displaceability of the rotor-side freewheel component 20, an undercut in the shape of a groove 91 is as a rule inserted. The groove 91 axially follows the non-round inner contour 37 and is finally delimited by the shoulder 35. A ring 92 for centering the support unit 84 may be received in the groove 91 as is shown in the bottom half of FIG. 4. The ring 92 may contribute to cause, or assist with, centering of the freewheel unit 81 in mounting. In many cases, such a ring 92 may be dispensed with since the assembly 83 is self-centering due to the non-round outer contour 21 in the non-round inner contour 37.

Figure 5:
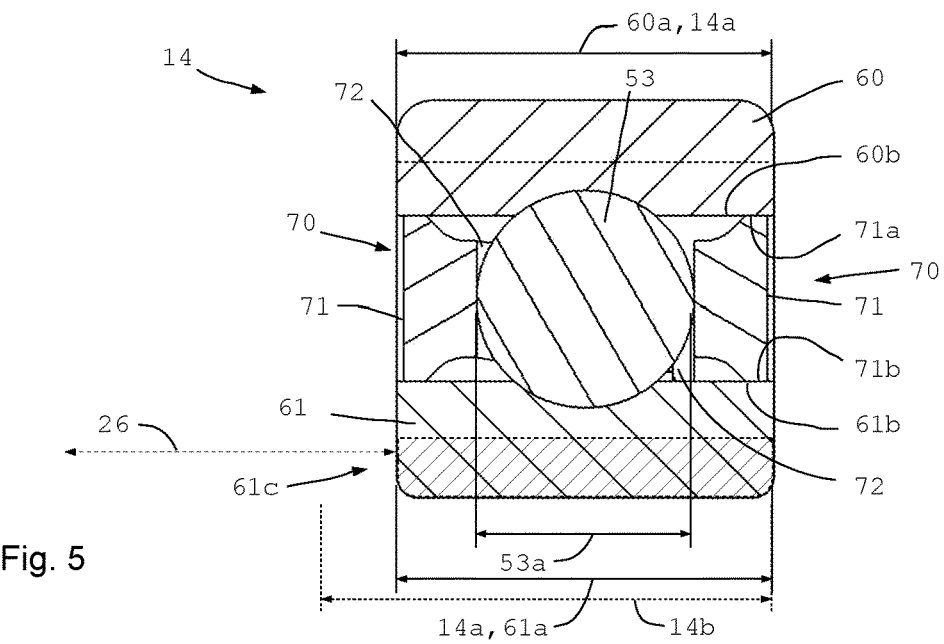
FIG. 5 a section of a roller bearing of a hub according to the invention.

FIG. 5 shows an individual roller bearing 14 in cross section. The roller bearing 14 is configured as a deep-groove ball bearing and has the inner bearing ring 61 and the outer ring 60 between which the rolling members 53 are disposed. To the right and the left, one modular unit 70 each is inserted between the bearing rings 60 and 61. The modular units 70 recognizably show just a small portion of a guide unit 72 which serve to position and guide the rolling members.

The bearing rings 60 and 61 each show the same axial width 60a respectively 61a, corresponding to the axial width of the roller bearing 14. A broken line exemplarily shows a width 14b of a roller bearing of a prior art hub. The axial width 14a, which is narrower than the width 14b, allows to (suitably) increase the axial distance between the two hub bearings 14, 24.

It is assumed that what in the FIG. 3 is the right-side end of the roller bearing 14, remains in the same axial position due to the freewheel, and the narrower axial width of the roller bearing can be partially or entirely used for increasing the distance 26.

In analogy, the axial distance between the two hub bearings 6, 7 can be (suitably) increased. The wider support and the narrower roller bearings enable a more stable structure of the hub and a lower weight of the hub.

One can clearly identify the radially outwardly sealing surface 71a and the radially inwardly sealing surface 71b of the sealing unit 71. Each modular unit 70 comprises an annular unit 71, the cross section of the sealing unit 71 tapering radially outwardly and radially inwardly so as to maintain the lowest possible friction of the contact surface against the bearing rings. The contact surfaces 60b and 61b on the bearing rings 60 and 61 are ground to ensure low friction.

Also shown is the presently identical axial width 60a, 61a of the bearing rings 60 and 61, and also the axial width 53a respectively the diameter 53a of the rolling members 53. The ratio of the axial width 60a to the diameter 53a is 1.55. Optimization may further reduce this ratio. This reduces weight still further.

FIG. 5 illustrates some optional variants on the inner bearing ring 61 and the outer bearing ring 60. The bearing ring 61 may be configured as a hybrid bearing ring 61c which consists of at least two different materials, in particular steel and ceramics. This combines high durability with a low weight. The region made of the second material in the hybrid bearing ring 61c is shown with a broken edge line and hatched. In analogy, the outer bearing ring 60 may also be configured as a hybrid bearing ring, as the broken horizontal line indicates. The contours of the individual material regions may show a different shape. It is also possible for the bearing rings 60, 61 to consist of one single material only, as the solid lines indicate.

Figure 6:
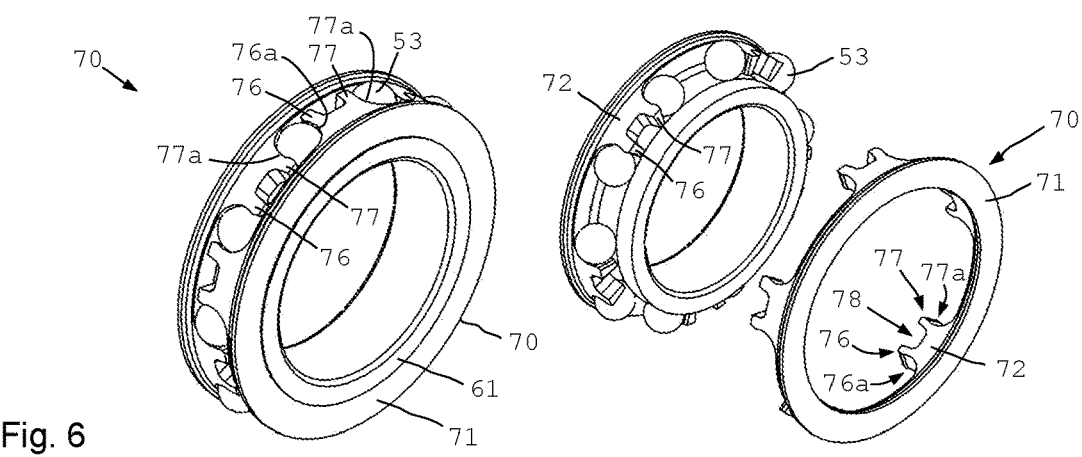
FIG. 6 the roller bearing of FIG. 5 absent an outer bearing ring.

FIG. 6 shows the roller bearing 14 without an outer ring 60. The individual balls 53 can be identified. One can also identify the guide members 76 and 77, which roughly speaking divert approximately in a V-shape, of the guide units 72. FIG. 6 shows in the portion on the right a modular unit 70 with the parts distanced from one another. It is clearly shown that the guide units 72 of the pulled-off modular unit 70 exactly mesh with the guide units 72 of the other modular unit 70. In this way, each of the rolling members 53 is guided on one side, by one of the modular units 70 and on the other side, by the other of the modular units 70.

Figure 7:
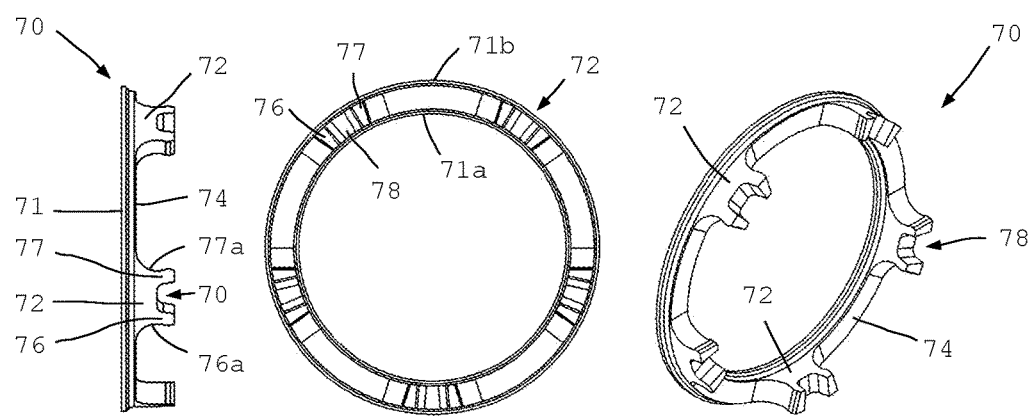
FIG. 7 a modular unit of the roller bearing according to FIG. 5.

FIG. 7 shows various views of a modular unit 70, illustrating a side view on the left, a top view in the middle, and a perspective illustration on the right. The modular unit 70 is provided with a sealing unit 71, followed axially inwardly by an annular unit 74, from which the guide units 72 extend, again axially inwardly. A recess for example in the shape of a groove 78 may extend between the guide members 76 and 77 of a guide unit.

FIG. 8 shows a detail of a variant of a modular unit 70, wherein an elevation 79 is configured between adjacent guide units 72, so as to enhance the separation of the rolling members 53 from one another in the guide surfaces 76 and 77. The elevation 79 may also show guide surfaces for the rolling members 53, as can be seen in FIG. 8.

FIG. 9 illustrates a variant with click elements 76b and 77b in the shape of recesses or undercuts configured on the guide units 72. Thus, click elements 75 of the other of the modular units can click into the click elements 76b, 77b of the guide units 72 configured as grooves or the like. This enables resilient click-in engagement of the two modular units with one another, even without rolling members.

FIG. 10 shows an embodiment where the groove 78 is configured deeper between the guide members 76, 77.

FIG. 11 shows a hollow space or recess 72a in the interior of the guide unit 72. The recesses 72a allow to achieve a better and more even spread of material and also a lower total weight in manufacturing the modular units 70. A cover (not shown) may be provided on top.

FIG. 11 also shows the radially inwardly sealing surface 71a and the radially outwardly sealing surface 71b of the sealing unit 71. The sealing surfaces are preferably configured integrally with the sealing unit 71. Alternately, the sealing surfaces may be integrally molded with the sealing unit 71, consisting of a different material.

Figure 12:
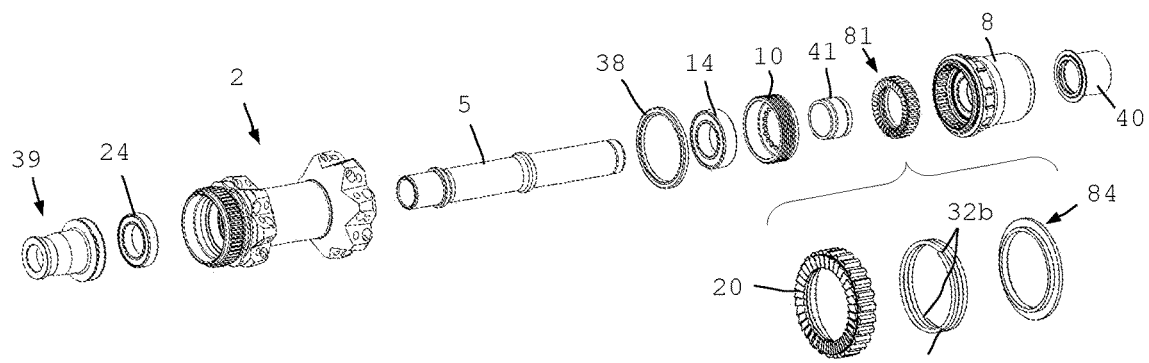
FIG. 12 an exploded view of the hub according to FIG. 3.

FIG. 12 shows a perspective exploded view of the individual components of the hub 1. The limit stop 39 is shown at the end on the left. To the right follow the roller bearing 24 for supporting the hub shell 2 and the hub axle 5. Then follow the sealing device 38 for sealing between the hub shell and the rotor, the roller bearing 14, the hub-side freewheel component 10, the sleeve body 41, the freewheel unit 81 and the rotor 8, and the rotor-side limit stop 40.

The components of the freewheel unit 81 which together form the assembly 83 are shown enlarged beneath. The freewheel unit 81 consists of the freewheel component 20, the spring unit 32 the coil ends 32b of which can be recognized, and the support unit 84, which when assembled result in a preassembled assembly 83 which is inserted into the hub as a whole in mounting.

The roller bearings 14, 24 and the roller bearings 6, 7, which are located inside the rotor, are configured according to FIG. 5. Alternately it is for example possible for the roller bearings 6, 7 in the rotor to be configured conventionally.

Figure 13:
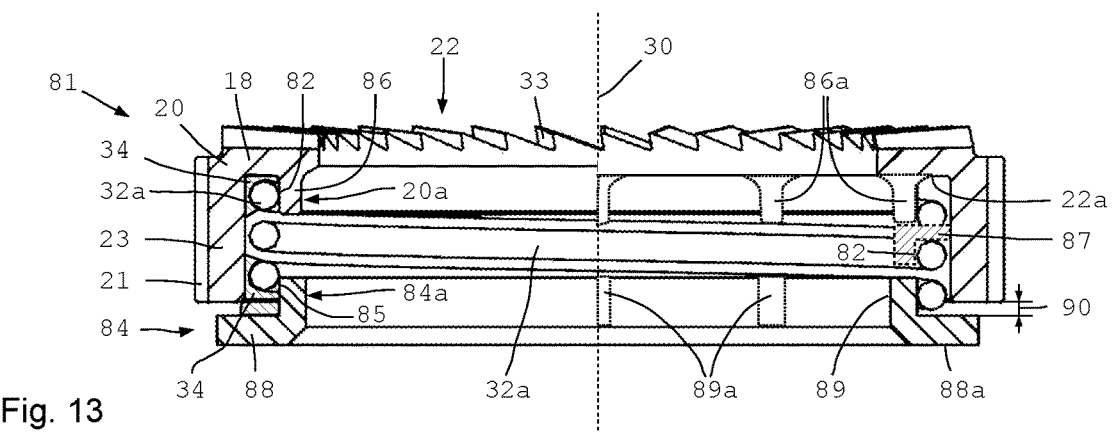
FIG. 13 a freewheel unit of the hub according to FIG. 3.

FIG. 13 shows a cross-section of a freewheel unit 81. On the right and left of the central axis 30 slightly different versions of the freewheel unit 81 are illustrated.

At any rate the freewheel unit 81 comprises a freewheel component 20, a spring unit 32 and a support unit 84, combined to form an assembly 83. The spring unit 32 is fastened at a first end on an accommodation section 82 of the freewheel component 20. The accommodation section 82 may be configured on a circumferential takeup flange 86.

It is also possible for the accommodation section 82 to consist of multiple part sections configured on individual takeup tabs 86 which are disposed over the circumference of the freewheel component 20. Takeup tabs or accommodating members 86 may for example be present in specific angular sections. Individual accommodating members 86a are shown on the right half in FIG. 13 while the left half of FIG. 13 indicates a circumferential takeup flange 86.

It is also possible for a takeup tab or a circumferential takeup flange to be configured on a separate annular wall 87 disposed in parallel to, and spaced apart from, the front face 22. Instead of the annular flange 18 this annular wall 87 may serve to support and to attach the spring unit 32 secure against loss.

It is likewise possible for a circumferential support flange 89 to provide a circumferential support section 85 on the support unit 84, as is indicated in the left half of FIG. 13.

The right half of FIG. 13 illustrates individual support members or support tabs 89 which combined provide such a support section 85.

Various combinations of individual components and circumferential flanges are possible.

FIG. 13 also shows the maximum stroke length 90 by which the freewheel unit can be compressed in the axial direction 30 before the freewheel component 20 and the support unit 84 go into lockout. In the exemplary embodiment the stroke length 90 in the installed and thus biased state is less than 2 mm and depending on the number and configuration of the engagement components 33 it may be larger or smaller. The required axial movement for bringing the engagement components 33 from the engagement to the freewheel position is presently less than 1 mm. In the preassembled but not yet installed state a stroke length of 4 mm, 5 mm, 6 mm, or even 10 mm or 12 mm or more is possible.

The back face of the support unit 84 shows an abutting surface 88a by means of which the freewheel unit 20 rests on the shoulder 35 in the rotor. This achieves exactly defined conditions.

As a rule, the spring unit 32 stays on the freewheel component 20 without any further means due to the matching dimensions.

Alternatively, it may be planned or unintended in the case of unfavorable tolerances, that the spring unit 32 does not adhere unassisted to the freewheel component 20. In these cases the end of the spring unit 32 may be fastened or "stuck on" by means of some lubricant 34 e.g. prior to mounting following maintenance or when initially mounting.

The lubricant 34 such as grease or the like may be fed e.g. locally (preferably over at least one section) into the circumferential groove between the takeup flange 86 and the inner wall 23a of the tubular body section 23.

A suitable quantity of lubricant 34 may also be applied on the support unit 84 to connect the spring unit with, or fasten it to, the support unit on its other end. It is also possible to apply a suitable quantity of lubricant 34 (only) to one end, or to both ends, of the spring unit.

The lubricant 34 is exemplarily shown in hachure in FIG. 13 on the two ends of the spring unit. Then the spring unit 32 adheres to the freewheel component and/or the support unit by way of the lubricant sufficiently securely for mounting. At least for (initial) mounting there results a modular unit the individual parts of which are sufficiently firmly connected with one another.

The support unit shows a safety device 84a extending axially in the direction of the freewheel component and the freewheel component shows a protective device extending axially in the direction of the support unit, each so as to prevent an end of the spring unit from side-slipping inwardly. Otherwise the axially outwardly end of the spring unit 32 could come to rest on the sealing unit 71 at the rotor bearing 6 from FIG. 12. This would apply pressure on the rolling members, impeding the sealing and the other functions. The safety device 84a shown is configured as a support flange 89 or comprises multiple support members 89a.

The protective device 20a at the freewheel component 20 comprises a takeup flange 86 or multiple accommodating members 86a preventing the spring unit 32 from sideslipping inwardly at its other end.

The protective device 20a and a safety device each extend over an axial length that is larger than half the diameter, and preferably larger than the diameter, of the body of a coil 32a of the spring unit 32.

Figure 14:
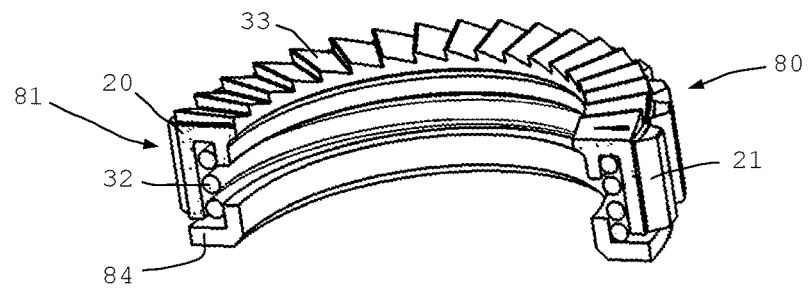
FIG. 14 a perspective sectional view of the freewheel unit according to FIG. 13.

FIG. 14 shows a sectional perspective view of the freewheel unit 81 in which the compact structure is illustrated. The entire freewheel unit 81 is only slightly longer in the axial direction than the freewheel component 20 with the axial toothing.

In all the configurations, the ratio of the axial length of a freewheel unit 81 to the axial length of a freewheel component of the freewheel unit in the mounted state in a hub 1 is preferably less than 3:2 and, in particular, less than 4:3 and particularly preferably less than 5:4 or less than 6:5. This is advantageous since the freewheel component needs a certain length for axial guiding and on the other hand a shorter overall length enables improved support of a hub.

Figure 15:
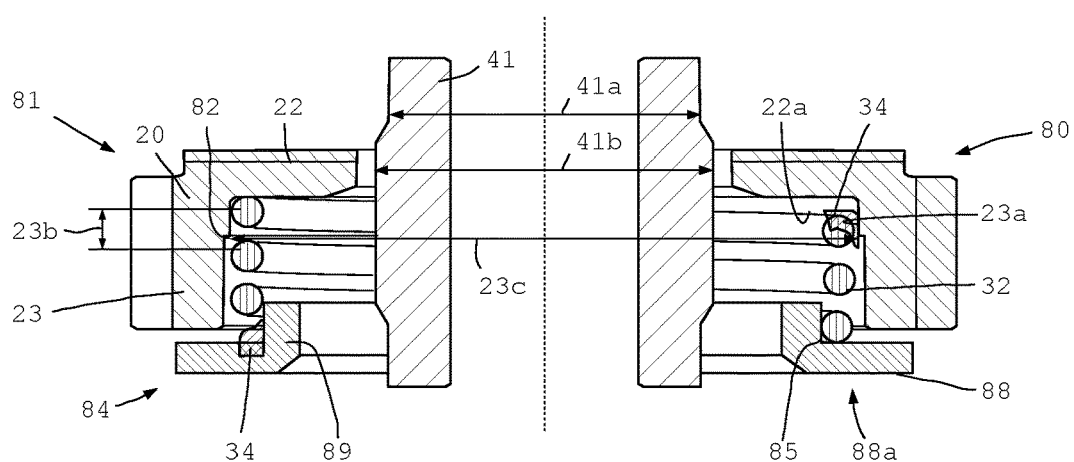
FIG. 15 another freewheel unit for a hub according to FIG. 3.

FIG. 15 shows another configuration of a freewheel unit 81 in a schematic cross-section. The freewheel unit 81 in turn is provided with a freewheel component 20 and a spring unit 32 configured as a coil spring and also a support unit 84. One of the ends of the spring unit 32 is received on the freewheel component 20 in a force fit and the other of the ends, connected with the support unit 84 in a force fit so as to provide a preassembled assembly 83.

A part of a coil 32a of the spring unit 32 is clamped to a longitudinal section 23b on the inner wall 23a of the tubular body section 23 of the freewheel component 20. This accommodation section 82 is provided by the inner wall 23a in the longitudinal section 23b having a slightly smaller inner diameter 23c.

Additionally, the sleeve body 41 is shown which is located radially inwardly of the freewheel unit 81 including in the completely assembled state of a hub 1. The sleeve body 41 shows two diameter sections with the diameters 41a and 41b. At the ends the wall thicknesses are slightly less for saving weight. In the central region, the wall thickness is slightly larger.

In FIG. 15, a quantity of lubricant 34 is again shown in hachure on the freewheel component 20 and the support unit 84 which can be suitably applied if the individual components do not per se stick together such as, e.g., due to less than optimal tolerances in a particular case. A suitable quantity of lubricant 34 in suitable spots results in an assembly 83 sticking sufficiently together at least for mounting so as to ensure reproducible mounting.

Figure 16:
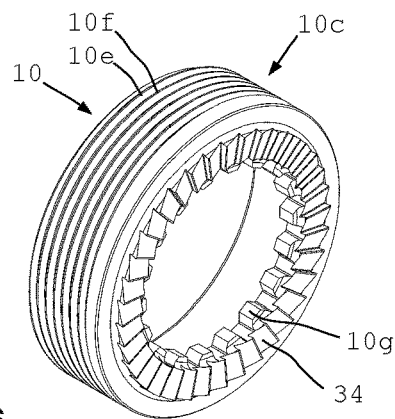
FIG. 16 a hub-side freewheel component of the hub according to FIG. 3.

FIG. 16 shows a perspective illustration of the hub-side freewheel component 10, preferably provided with multiple external threads 10c having two thread grooves 10e and 10f with which to screw the freewheel component 10 into the hub shell 2. The front face shows the axial engagement components 33. A radially inwardly inner contour 10g is shown which serves to demount the hub-side freewheel component 10 to enable unscrewing the hub-side freewheel component 10 out of the hub shell 2. A tool contour 10g is preferably configured in all the configurations and exemplary embodiments. The tool contour 10g may show different shapes, for example the contour shown. Otherwise an inner polygon or suitable depressions are conceivable.

Figure 17:
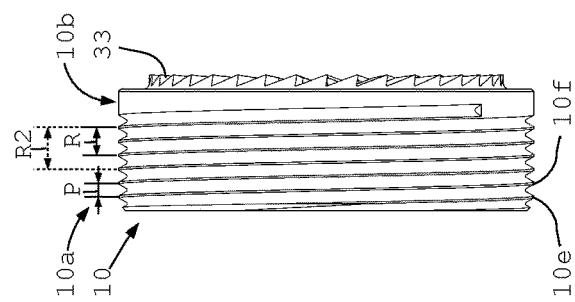
FIG. 17 a side view of the hub-side freewheel component according to FIG. 16.

FIG. 17 shows a side view of the hub-side freewheel component 10 wherein the attachment region 10a, presently with a multiple thread, and the centering region 10b can be identified. In the attachment region 10a, the presently multiple thread is illustrated with the pitch P and the gradient R. The individual thread grooves 10e and 10f can be identified.

Figure 18:
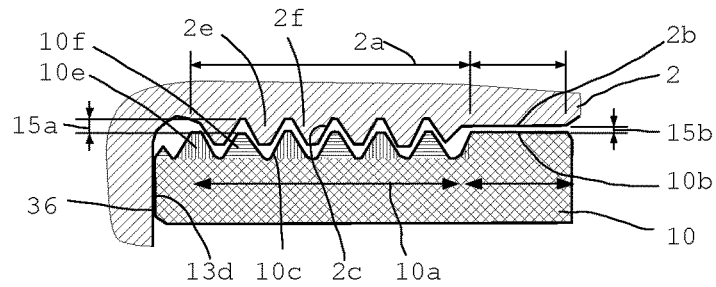
FIG. 18 a schematic diagrammatic drawing of a detail from FIG. 3.

FIG. 18 shows a schematic cross-section of the preferred variant with a multiple thread, wherein the screwed connection of the hub-side freewheel component 10 with the hub shell 2 is illustrated simplistically and enlarged. One can identify the individual threads 2e, 2f, and 10e and 10f in the hub shell respectively the hub-side freewheel component 10 and the length of the attachment portion 2a respectively attachment region 10a and the corresponding length of the centering portion 2b and the centering region 10b. In the centering portion 2b, the tolerance 15b is considerably smaller than the tolerance 15a in the attachment portion 2a. The use of a single thread is also possible.

At the axially inwardly end, the front end 13d of the axial body section 13 abuts against the radial shoulder 36 in the hub shell 2 so as to obtain a defined seat of the hub-side freewheel component 10.

FIG. 19 illustrates a hub 1 according to the invention, which is presently configured as a front wheel hub of a bicycle. The hub 1 comprises a hub body 2, a hub axle 5, and is supported by way of roller bearings 14, 24. Spoke flanges 17 serve to attach spokes. Adapter rings respectively limit stops 39, 40 are pushed onto the hub axle 5 on both ends of the hub 1. The limit stops 39, 40 are configured with one recessed grip 25 each. The limit stops 39, 40 are configured with seals 46, 47 to prevent dirt or water from entering the hub interior as far as possible.

The roller bearings 14, 24 rest axially inwardly against the radial bulges 43, 44 of the hub axle 5. Accordingly, the outer rings of the roller bearings 14, 24 rest against radial shoulders in the hub shell.

The roller bearings 14, 24 are each provided with a separate seal to prevent dirt and water from penetrating into the roller bearings. Moreover, the interior of the roller bearings contains a lubricant supply to provide reliable lubrication of the rolling members 53 over the service life of the roller bearings 14, 24.

Therefore, the seals for sealing the roller bearings 14, 24 for one, retain the lubricant inside the roller bearings and for another, prevent dirt and water from penetrating into the roller bearing.

The roller bearings 14, 24 are configured as described above. The top portion of FIG. 19 shows the schematic structure of the roller bearings 14, 24. The roller bearings have an inner ring 61 and an outer ring 60. Rolling members 53 are disposed between. These roller bearings 14 are configured as sealed deep-groove ball bearings.

Sealing and guiding the rolling members is provided by the modular units 70, each of which is provided with an annular sealing unit 71 for sealing the roller bearings and with guide units 72 for guiding the rolling members.

The modular units 70 are configured integrally and preferably consist entirely of one material.

The weight of the hub 1 configured as a front wheel hub may also be reduced. Moreover the structural stiffness of the front wheel can be increased since the axial distance of the roller bearings 14, 24 can be increased.

FIG. 20 shows another exemplary embodiment of a hub 1 comprising two identical freewheel units 81.

The hub 1 according to the invention illustrated in a schematic cross-section comprises a hub shell 2 and a hub axle 5, onto the ends of which limit stops 39 and 40 are pushed. Roller bearings 24 respectively 14 serve to rotatably support the hub shell, and roller bearings are employed as rotor bearings 6 and 7 to rotatably support the rotor. All the bearings are configured as roller bearings, each being provided with pairs of modular units 70 for guiding the rolling members 53 and for axially sealing the roller bearings. The axial distance of the hub bearings 14 and 24 ensues from the shoulders on the radial bulges on the hub axle 5. A sleeve body 42 is disposed between the rotor bearings 6 and 7, and a sleeve body 41 is disposed between the rotor bearing 6 and the rotor-side hub bearing 14.

In this embodiment of a rear wheel hub 1, the roller bearings for supporting the hub shell are again structured relative to the hub axle as it is described above with reference to the hub according to FIGS. 3 and 19. The roller bearings 14, 24 and preferably 6, 7 as well, are each provided with an inner ring 61 and an outer ring 60 with rolling members 53 disposed between and retained in position relative to one another by way of guide units 72 of the modular units 70. The modular units 70 are combined sealing and guiding units and seal the roller bearings axially outwardly by means of the sealing units 71.

The construction of the roller bearings 14, 24 enlarges the axial distance between the roller bearings 14, 24 so as to increase the stiffness of the hub. At the same time, the weight of the hub shell can be reduced by way of reduced wall thicknesses. Weight is also saved by way of the reduced axial width of each of the roller bearings.

Spoke flanges 17 serve to attach spokes.

This freewheel device 9 comprises two identical freewheel units 81. Each of these freewheel units 81 comprises a freewheel component 10 respectively 20, a spring unit 32 and a support unit 84.

The spring unit 32 is fastened to the freewheel component 10 and 20 respectively and to the support unit 84 with its respective ends so as to result in a preassembled assembly 83 each.

The preassembly of the assembly 83 allows to enhance the quantity already when the hubs 1 are initially mounted. Moreover, increased reproducibility and quality is enabled in later demounting and subsequent re-mounting.

The floating mounting of the two axial toothings 33 achieves particular flexibility in adapting the freewheel device 9.

The hub-side freewheel component 10 is accommodated non-rotatably and axially displaceably in the threaded ring 29 that is screwed into the hub shell. The enlarged detail on the bottom left shows the presently screw-connected, multiple threads 29c and 2c. The threaded ring 29 shows the thread grooves 29e and 29f of the presently double external thread screwed to the thread grooves 2e and 2f of the hub shell 2. Again, a lower axial force acts on the hub shell 2 than when using a single thread.

The rotor-side freewheel component 20 is non-rotatably and axially displaceably accommodated in the rotor 8. To this end, the threaded ring 29 and the rotor 8, or the freewheel components 10 and 20, each show a matching non-round outer contour 21 and inner contour 37.

In all the configurations, a freewheel unit 81 provides a clearly defined support on both of its sides. Due to the configuration and fixing, the conditions hardly change at all in operation or only slightly. Absent fixing to the spring unit, a conventional freewheel shows changes to the pertaining supporting surfaces in operation due to changing roughness or wear. Such changes are undefined. A freewheel unit 81 according to the present invention always provides defined conditions so as to also achieve a longer service life.

The large diameter spring unit allows reliable and sufficiently strong biasing. A circumferential spring unit offers considerable advantages since it always responds precisely over the entire circumference.

In all the configurations, the hub allows increased lateral stiffness, an increased bending stiffness, and a still safe operation, and easier maintenance. At the same time, the weight may be reduced which is of particular importance in the area of sports and for professional use.

Another advantage is the smaller cross-section of the hub body which is thus aerodynamically better. The quantity of parts is smaller so as to make servicing, assembly and disassembly easier. Manufacturing the hub is also easier.

Another advantage can be achieved by multiple threads so as to result in reduced loads on the hub shell and reduced self-retention.

In all the configurations, it is preferred to employ ground inner bearing rings in the roller bearings. A ground outer ring may also be employed so as to obtain very low frictional coefficients.

While a particular embodiment of the present hub for an at least partially muscle-powered bicycle has been described herein, it will be appreciated by those skilled in the art that changes and modifications may be made thereto without departing from the invention in its broader aspects and as set forth in the following claims.

| List of reference numerals: | |
| --- | --- |
| 1 | hub |
| 2 | hub shell |
| 2a | attachment portion |
| 2b | centering portion |
| 2c | internal thread |
| 2e | thread groove |
| 2f | thread groove |
| 3, 4 | end region |
| 5 | hub axle |
| 6, 7 | rotor bearing |
| 8 | rotor |
| 9 | freewheel device |
| 10 | freewheel component |
| 10a | attachment area |
| 10b | centering area |
| 10c | external thread |
| 10e | thread groove |
| 10f | thread groove |
| 10g | inner contour |
| 11 | receiving space |
| 12 | bearing seat |
| 13 | axial body section |
| 13d | stopper |
| 14 | roller bearing |
| 14a | width of 14 |
| 14b | width |
| 15a | tolerance, play |
| 15b | tolerance, play |
| 16a | distance |
| 17 | spoke flange |
| 18 | annular flange |
| 20 | freewheel component |
| 20a | protective device |
| 21 | outer contour |
| 22 | front surface, front face |
| 22a | supporting surface |
| 23 | tubular body section |
| 23a | inner wall |
| 23b | longitudinal section |
| 23c | diameter |
| 24 | roller bearing |

| | |
|---|---|
| \multicolumn{2}{c}{List of reference numerals:} |
| 24a | width of 24 |
| 25 | recessed grip, taper |
| 26 | bearing distance 14, 24 |
| 27 | bearing distance 6, 7 |
| 28 | rotor-side annular flange |
| 29 | threaded ring |
| 29c | multiple external thread |
| 29e | thread groove |
| 29f | thread groove |
| 30 | central axis, axis of symmetry |
| 31 | engagement position |
| 32 | biasing device, spring unit |
| 32a | coil |
| 32b | coil end |
| 33 | engagement components, axial toothing |
| 34 | lubricant |
| 35 | shoulder in 8 |
| 36 | radial shoulder |
| 37 | inner contour |
| 38 | sealing device |
| 39, 40 | limit stop |
| 41 | sleeve body |
| 41a | diameter |
| 41b | diameter |
| 42 | sleeve body |
| 43, 44 | radial bulges |
| 46 | double flange of 39 |
| 47 | sealing flange of 40 |
| 48 | O-ring |
| 49 | quick release |
| 53 | rolling member |
| 53a | diameter |
| 60 | outer ring |
| 60a | axial width |
| 60b | sealing surface |
| 61 | inner ring |
| 61a | axial width |
| 61b | sealing surface |
| 61c | hybrid bearing ring |
| 70 | modular unit |
| 71 | sealing unit |
| 71a | inner sealing surface |
| 71b | outer sealing surface |
| 72 | guide unit |
| 72a | recess |
| 74 | annular unit |
| 75 | click element |
| 76 | guide member |
| 76a | guide surface |
| 76b | click element |
| 77 | guide member |
| 77a | guide surface |
| 77b | click element |
| 78 | groove |
| 79 | elevation |
| 81 | freewheel unit |
| 82 | accommodation section |
| 83 | assembly |
| 84 | support unit |
| 84a | safety device |
| 85 | support section |
| 86 | takeup flange, takeup tab |
| 86a | accommodating member |
| 87 | annular wall |
| 88 | support disk |
| 88a | abutting surface |
| 89 | support flange, support tab |
| 89a | support member |
| 90 | stroke length |
| 91 | groove |
| 92 | ring |
| 100 | bicycle |
| 101 | wheel, front wheel |
| 102 | wheel, rear wheel |
| 103 | frame |
| 104 | fork, suspension fork |
| 105 | rear wheel damper |
| 106 | handlebar |
| 107 | saddle |
| 109 | spoke |
| 110 | rim |
| 112 | pedal crank |
| P | pitch |
| R | gradient |

The invention claimed is:

1. A hub for an at least partially muscle-powered bicycle, comprising:
  a hub axle and an axle device;
  the hub shell being supported rotatably relative to the axle device by way of bearing devices;
  wherein at least one bearing device is configured as a roller bearing, comprising two bearing rings with rolling members disposed between, and being sealed axially outwardly;
  between the bearing rings at least one roller bearing receives a modular unit, at which a sealing unit is configured for laterally sealing the roller bearing; and
  comprising guide units protruding laterally inwardly from the modular unit for guiding the rolling members;
  wherein the modular unit comprises an annular unit which is connected with the sealing unit that is configured in a washer shape, and
  wherein the sealing unit rests against, making contact with, both of the bearing rings for sealing.

2. The hub according to claim 1, characterized in that at least one roller bearing is configured narrow, and the axial width of the roller bearing is narrower than 1.7 times the diameter of a rolling member of the roller bearing, so as to increase the axial distance between the roller bearings and to obtain a wider support.

3. The hub according to claim 1, wherein a bearing ring is configured as an inner ring, and wherein the other of the bearing rings is configured as an outer ring, and wherein the rolling members are axially received between the modular units.

4. The hub according to claim 1, wherein the ratio of the axial width of a roller bearing to the diameter of a rolling member is between 1.2 and 1.6.

5. The hub according to claim 1, wherein the bearing rings protrude axially outwardly to both sides beyond the modular units.

6. The hub according to claim 1, wherein at least one roller bearing comprises two modular units on opposite axial sides of the roller bearing, and wherein the guide units are at least partially resilient and lock in the final position during mounting.

7. The hub according to claim 1, wherein at least some of the guide units extend in the axial direction over between 50% and 80% of the axial width of at least one bearing ring.

8. The hub according to claim 1, wherein the guide units comprise rounded guide surfaces facing away from one another for rolling members, wherein the guide surfaces facing away from one another guide one rolling member each, and wherein the guide unit comprises two guide members protruding from the modular unit, between which a recess in the shape of a groove is formed, and wherein at least one recess is configured in the interior of the guide unit.

9. The hub according to claim 1, wherein an axial elevation for separating the rolling members is configured between two guide units on the axially inside surface of the annular unit, and wherein at least one guide surface is configured on the axial elevation.

10. The hub according to claim 1, wherein the two modular units are identical in construction and interlock at an offset when mounted.

11. The hub according to claim 1, wherein at least one modular unit consists at least partially of a plastic.

12. The hub according to claim 1, wherein at least one bearing ring consists at least partially of a material taken from a group of materials comprising steel, ceramics, and metal matrix composites.

13. The hub according to claim 12, wherein at least one bearing ring is configured as a hybrid bearing ring and consists at least partially of steel and at least partially of ceramics.

14. The hub according to claim 1, wherein the sealing surfaces of the bearing rings are ground.

15. The hub according to claim 1, wherein the axial width of at least one of the roller bearings, given an external diameter between 20 mm and 40 mm, is less than 6.5 mm.

16. The hub according to claim 1, wherein at least one of the roller bearings is designed for a permanent speed of less than 1000 U/min.

17. The hub according to claim 1, comprising a rotor rotatably supported relative to the hub axle by at least two rotor bearings configured as roller bearings,
and a freewheel device having two interacting freewheel components namely, a hub-side freewheel component and a rotor-side freewheel component,
wherein the two freewheel components each comprise axial engagement elements and are movable relative to one another in the axial direction at least between a freewheel position and an intermeshing engagement position,
wherein the hub-side freewheel component provides for defined accommodation of a roller bearing to support the hub shell relative to the hub axle,
wherein an attachment portion and a centering portion are configured in the hub shell,
and wherein an attachment area and a centering area are configured on the hub-side freewheel component,
and wherein the attachment area is connected with the attachment portion, and wherein the centering area is centered on the centering portion.

18. The hub according to claim 1, comprising a freewheel unit comprising a freewheel component, a support unit and at least one spring unit,
wherein the freewheel component comprises a tubular body section extending around a central axis and configured hollow, showing a non-round outer contour for non-rotatable and axially displaceable coupling, and a front surface with axial engagement components,
and wherein the spring unit urges the freewheel component and the support unit apart in an axial direction of the central axis,
wherein the freewheel component, the support unit and the spring unit form an assembly suitable for pre-assembly, and wherein the spring unit is attached to the freewheel component and to the support unit.

19. The hub according to claim 1,
wherein the hub shell is supported rotatably relative to the axle device by way of bearing devices configured as hub bearings,
comprising a rotor rotatably supported relative to the axle device by at least two rotor bearings,
and a freewheel device having two interacting freewheel components namely, a hub-side freewheel component and a rotor-side freewheel component,
wherein the two freewheel components each comprise axial engagement elements and are movable relative to one another in the axial direction at least between a freewheel position and an intermeshing engaging position, wherein in the engaging position a driving torque can be transmitted in a direction of drive rotation,
wherein the hub-side freewheel component comprises an axial body section which is provided with a thread and is screwed into the hub shell by means of a thread, and wherein the hub-side freewheel component comprises an axial annular surface on which the axial engagement elements are formed at least in part,
the rolling members of a hub bearing show a defined accommodation inside the hub-side freewheel component to support the hub shell relative to the axle device, and wherein the hub-side freewheel component comprises at least one tool contour which couples to an adapted tool for releasing the screw connection of the hub-side freewheel component with the hub shell.

20. The hub according to claim 1, wherein the hub shell is supported rotatably relative to the axle device with bearing devices configured as hub bearings, comprising a rotor rotatably supported relative to the axle device with at least two rotor bearings, and a freewheel device having a pair of interacting freewheel components namely, a hub-side freewheel component and a rotor-side freewheel component,
wherein the two freewheel components each comprise axial engagement elements and are movable relative to one another in the axial direction at least between a freewheel position and an intermeshing engagement position,
wherein the hub-side freewheel component provides for defined accommodation of rolling members to support the hub shell relative to the axle device,
an attachment portion and a centering portion are configured in the hub shell,
and an attachment area and a centering area are configured on the hub-side freewheel component, and
the attachment area is connected with the attachment portion and the centering area is centered on the centering portion.

* * * * *